US010472525B2

(12) United States Patent
Fernandez Gonzalez et al.

(10) Patent No.: US 10,472,525 B2
(45) Date of Patent: Nov. 12, 2019

(54) USE OF DITHIOPHOSPHINIC ACID AND/OR ITS SALTS FOR PRODUCING ANTI-CORROSION COATINGS THAT ARE DEVOID OF CHROME (71) Applicant: BASF SE, Ludwigshafen (DE)

(72) Inventors: Monica Fernandez Gonzalez, Frankenthal (DE); Markus Hickl, Münster (DE); Cordula Mock-Knoblauch, Lantau Island (CN); Manfred Essig, Otterberg (DE); Wolfgang Schrepp, Heidelberg (DE); Manfred Biehler, Ilbesheim (DE)

(73) Assignee: BASF COATINGS GMBH, Ludwigshafen am Rhein (DE)

( * ) Notice: Subject to any disclaimer, the term of this patent is extended or adjusted under 35 U.S.C. 154(b) by 592 days.

(21) Appl. No.: 15/048,090

(22) Filed: Feb. 19, 2016

(65) Prior Publication Data
US 2016/0168390 A1 Jun. 16, 2016

Related U.S. Application Data (63) Continuation of application No. 11/815,792, filed as application No. PCT/EP2006/050810 on Feb. 9, 2006, now abandoned.

(30) Foreign Application Priority Data

Feb. 10, 2005 (DE) .......................... 10 2005 006 233
Sep. 26, 2005 (DE) .......................... 10 2005 046 075

(51) Int. Cl.
C08F 2/46 (2006.01)
B01J 19/08 (2006.01)
C09D 5/08 (2006.01)
C23F 11/167 (2006.01)
C09D 133/14 (2006.01)

(52) U.S. Cl.
CPC ........... C09D 5/086 (2013.01); C09D 133/14 (2013.01); C23F 11/167 (2013.01)

(58) Field of Classification Search
CPC ..... C09D 5/086; C09D 133/14; C09D 11/167
USPC .................................................. 427/487, 457
See application file for complete search history.

(56) References Cited

U.S. PATENT DOCUMENTS

| 2,727,067 A | * | 12/1955 | Craig .................... A01N 57/18 209/166 |
| 2,809,979 A | | 10/1957 | Willis et al. |
| 2,881,200 A | | 4/1959 | Craig et al. |
| 3,454,517 A | | 7/1969 | Neros et al. |
| 3,580,894 A | | 5/1971 | Lenke |
| 4,292,152 A | | 9/1981 | Lechtken et al. |
| 4,298,738 A | | 11/1981 | Lechtken et al. |
| 4,308,214 A | | 12/1981 | Robertson et al. |
| 4,324,744 A | | 4/1982 | Lechtken et al. |
| 4,358,403 A | | 11/1982 | Distler et al. |
| 4,385,109 A | | 5/1983 | Lechtken et al. |
| 4,710,523 A | | 12/1987 | Lechtken et al. |
| 5,096,938 A | | 3/1992 | Beck et al. |
| 5,322,870 A | | 6/1994 | Lin |
| 5,466,508 A | | 11/1995 | Brocke et al. |
| 5,516,860 A | | 5/1996 | Reich et al. |
| 5,534,559 A | | 7/1996 | Leppard et al. |
| 5,707,941 A | | 1/1998 | Häberle |
| 5,872,279 A | | 2/1999 | Sugiya et al. |
| 6,348,528 B1 | | 2/2002 | Schlarb et al. |
| 6,583,214 B1 | | 6/2003 | Haeberle et al. |
| 6,726,881 B2 | | 4/2004 | Shinoki et al. |
| 7,105,206 B1 | | 9/2006 | Beck et al. |
| 2001/0002274 A1 | | 5/2001 | Lessmeister et al. |
| 2001/0046555 A1 | | 11/2001 | Lessmeister et al. |
| 2002/0103089 A1 | | 8/2002 | Fukushima et al. |
| 2004/0013815 A1 | * | 1/2004 | Gros ................. C09D 133/062 427/558 |
| 2004/0022950 A1 | | 2/2004 | Jung et al. |
| 2004/0104377 A1 | | 6/2004 | Phelps et al. |
| 2006/0115602 A1 | | 6/2006 | Beck et al. |
| 2006/0211815 A1 | | 9/2006 | Licht et al. |

FOREIGN PATENT DOCUMENTS

| CA | 2059145 A1 | 7/1992 |
| CA | 2374539 A1 | 11/2000 |
| DE | 3316593 A1 | 11/1984 |
| DE | 4308214 A1 | 9/1994 |
| DE | 19618720 A1 | 11/1996 |
| DE | 19632426 A1 | 1/1998 |
| DE | 19914896 A1 | 10/2000 |
| DE | 19923084 A1 | 11/2000 |
| EP | 0007508 B1 | 2/1980 |
| EP | 0047380 A1 | 3/1982 |
| EP | 0054105 A1 | 6/1982 |
| EP | 0057474 B1 | 8/1982 |
| EP | 0157133 A1 | 10/1985 |
| EP | 0279303 A2 | 8/1988 |
| EP | 0495751 | 7/1992 |

(Continued)

OTHER PUBLICATIONS

Essig et al, WO 2005/078025 Machine Translation, Aug. 25, 2005 (Year: 2005).*

(Continued)

Primary Examiner — Jessica Whiteley
(74) Attorney, Agent, or Firm — Drinker Biddle & Reath LLP (57) ABSTRACT Use of dithiophosphinic acids of the general formula $HS_2P(R^1)(R^2)$ and/or salts thereof for producing chrome-free, polymer-containing corrosion control layers on metallic surfaces, $R^1$ and $R^2$ independently of one another each being organic radicals having 1 to 30 C atoms.

14 Claims, 1 Drawing Sheet

(56) References Cited

FOREIGN PATENT DOCUMENTS

| | | | |
|---|---|---|---|
| EP | 0615980 B1 | 9/1994 | |
| EP | 0680985 A1 | 11/1995 | |
| WO | WO-99/46337 A1 | 9/1999 | |
| WO | WO-2005078025 A1 * | 8/2005 | ............. C09D 5/086 |

OTHER PUBLICATIONS

Chromy, L. et al., "Der Einfluß von Korrosionsinhibitoren auf die Schutzeigenschaften von Beschichtungen", Jahrgang, 1978, vol. 32, No. 11, pp. 434-437.

Horner, V. L. et al., "Vergleich der Schutzwerte einger phosphor-, schwefel- ind arse-organischer verbindungen gegenüber Eisenproben unterschiedlicher spezifischer Oberfläche", Horner und Hinrichs: Vergleigh der Schutzwerte, pp. 864-867.

Müller, B. et al., Lackformulierung und Lackrezptur, Coatings Compendien, pp. 188-204.

Römpp Lexikin, "Lacke und Druckfarben", p. 55.

Ullman's Encyclopedia of Technical Chemistry 6th Edition, "Paints and Coatings 2.5 Acrylic Coatings", pp. 29-33.

Ullman's Encyclopedia of Technical Chemistry 6th Edition, 2000, "Paints and Coatings 2.4.8 Polystyrene and Styrene Copolymers", pp. 28-29.

Ullman's Encyclopedia of Technical Chemistry 6th Edition, 2000, Paints and Coatings 2.6 Alkyd Coatings, pp. 48-52.

Ullman's Encyclopedia of Technical Chemistry 6th Edition, 2000, Paints and Coatings 2.9 Polyurethane Coatings, pp. 48-52.

Ullmans Encyklopädie der technischen Chemie 4., neubearbeitete und erweiterte Auflage, "Polyacryl-Verbindungen dis Quecksilber", Band 19, pp. 62-65.

Webster, G., Chemistry & Technology of UV & EB Formulation for Coatings, Inks & Paints, Surface Coating Technology, vol. 2, pp. 259-327.

* cited by examiner

USE OF DITHIOPHOSPHINIC ACID AND/OR ITS SALTS FOR PRODUCING ANTI-CORROSION COATINGS THAT ARE DEVOID OF CHROME

CROSS-REFERENCE TO RELATED APPLICATIONS

This application is a continuation application of copending U.S. application Ser. No. 11/815,792 filed Aug. 8, 2007, from which benefit is claimed under 35 U.S.C. § 120. U.S. application Ser. No. 11/815,792 is a national stage application (under 35 U.S.C. § 371) of PCT/EP2006/050810, filed Feb. 9, 2006, which claims benefit of German Application 10 2005 006 233.4, filed Feb. 10, 2005, and German Application 10 2005 046 075.5, filed Sep. 26, 2005, of which each listed application is incorporated herein by reference in their entirety.

The present invention relates to the use of dithiophosphinic acids of the general formula $HS_2P(R^1)(R^2)$ and/or salts thereof for producing chrome-free, polymer-containing corrosion control layers on metallic surfaces, $R^1$ and $R^2$ independently of one another each being organic radicals having 1 to 30 C atoms.

BACKGROUND OF THE INVENTION

For producing sheetlike metallic workpieces such as, for example, automobile parts, bodywork parts, instrument casings, exterior architectural facings, ceiling panels or window profiles, suitable metal sheets are shaped by means of appropriate techniques such as punching, drilling, folding, profiling and/or deep drawing. Larger components, such as automobile bodies, for example, are assembled if appropriate by welding together a number of individual parts. The raw material for this purpose normally comprises long metal strips which are produced by rolling the metal and which for the purposes of storage and transportation are wound up to form what are called coils.

Whereas in the past the corrosion control treatment was essentially carried out on the finished metallic workpiece—an automobile body assembled by welding, for example—nowadays the corrosion control treatment is increasingly being performed by coating the coil metal itself.

This technique is also referred to frequently as "coil coating". In coil coating the coif metals are coated continuously with—in general, liquid—coating materials. Metal coils 0.2 to 2 mm thick and up to 2 m in width, made of steel or aluminum, for example, are transported at a speed of up to 200 m/min through a coil coating unit, in the course of which they are coated with one or more corrosion control and/or paint layers.

A typical coil coating operation normally comprises the following steps:
1. If necessary: cleaning of the metal coil to remove contamination which has attached itself during the storage of the metal coil, and also to remove temporary corrosion control oils, by means of cleaning baths.
2. Application of a thin pretreatment layer (<1 µm) by dipping or spraying or by roll application. This layer is intended to increase the corrosion resistance and serves to improve the adhesion of subsequent paint layers to the metal surface. Known for this purpose are both Cr(VI)-containing and chromate-free pretreatment baths.
3. Application of a primer by a roll method. The dry layer thickness is normally about 5-8 µm. Solvent-based coating systems are used here.
4. Application of one or more topcoat layers by a roll method. The dry layer thickness here is approximately 15-25 µm. Here, likewise, solvent-based coating systems are employed.

Figure 1:
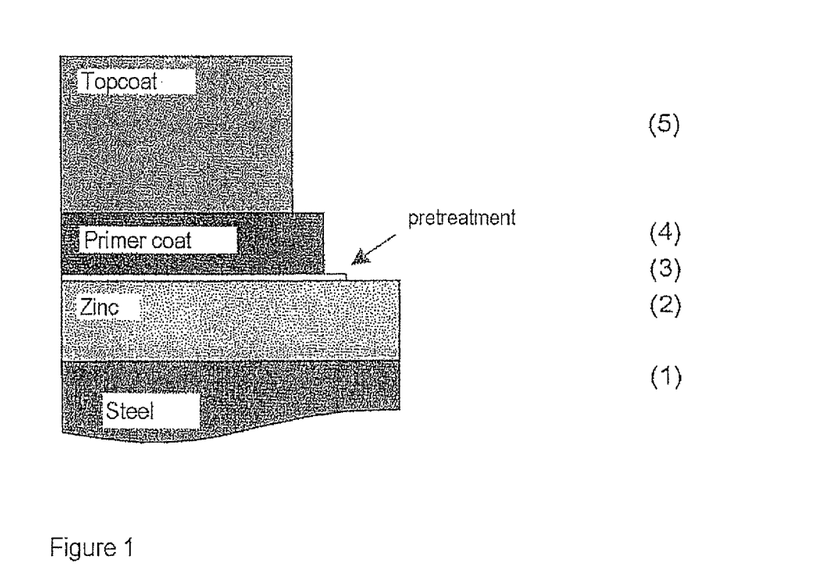
FIG. 1: section through a galvanized steel coil with conventional, two-stage pretreatment

The layer structure of a galvanized steel coil coated in this way is depicted in FIG. 1. The figure shows a section through a steel coil (1) which has been provided with a zinc layer (2) and to which a conventional pretreatment layer (3), a primer coat (4), and a topcoat (5) have been applied.

Metal coils coated in this way are employed, for example, to produce casings for what are called white goods (refrigerators, etc.), as facing sheets for buildings, or else in automotive engineering.

As set out above, the coating of the metal coils with the pretreatment layer (3) and with a primer coat (4) is very costly and inconvenient. Furthermore, market demand is on the increase for Cr(VI)-free systems for corrosion control. Proposals have therefore been made to replace separate application of a pretreatment layer (3) and of the organic prime coat (4) by application of a single, integrated pretreatment layer (3') which takes on the functions of both layers. A layer system of this kind is shown by way of example and diagrammatically in FIG. 2. The production of a coated metal coil is greatly simplified by a one-stage operation of this kind.

U.S. Pat. No. 5,322,870 discloses a composition for forming an integrated pretreatment layer, comprising a polymeric coating material, a crosslinker, and, in addition, alkyl- or arylphosphoric esters and/or alkyl- or arylphosphonic esters. The composition may optionally also comprise a pigment.

DE-A 199 23 084 discloses a chrome-free aqueous coating material for one-stage coating, the material comprising at least hexafluoro anions of Ti(IV), Si(IV) and/or Zr(IV), a water-soluble or water-dispersible film-forming binder, and an organophosphoric acid. The composition may optionally also comprise a pigment and crosslinking agents.

EP-A 878 519 discloses preferably chrome-free, aqueous compositions for producing corrosion control coatings, comprising 0.2 to 50 g/l of a thiocarbonyl compound, 0.1 to 5 g/l of phosphates, and water-soluble binders or binder dispersions. Optionally 10 to 500 g/l of $SiO_2$ may be present. The thiocarbonyl compounds may be, for example, thiourea, thioamides, thioaldehydes or thiocarboxylic acids.

DE-A 4 308 214 discloses a process for preparing dialkyl dithiophosphinates and also their use for ore extraction. U.S. Pat. No. 5,872,279 discloses the use of bis(1,1,3,3-tetramethylbutyl)thiophosphinic acid as an extractant for metals.

Homer, L; Hinrichs, H in Werkstoffe and Korrosion 1971 22, 864-868 disclose the use of diphenylthiophosphinic acid as a corrosion inhibitor for iron wires and iron powders in aqueous hydrochloric acid at a variety of concentrations.

Chromy, L; Marek, K, DEFAZET—Deutsche Farben-Zeitschrift 1978, 32, 434-437 disclose the use of diphenylthiophosphinic acid in a mixture with a vinyl chloride-vinylidene chloride copolymer or with a vinyl chloride-isobutyl ether-polyvinyl alcohol copolymer for coating steel in layer thicknesses of from 30 to 70 µm. When diphenylthiophosphinic acid was added to the polyvinyl alcohol polymers a deterioration was found in activity in comparison to the unadditized polymer.

DETAILED DESCRIPTION OF THE INVENTION

It was an object of the invention to provide an improved process for applying chrome-free corrosion control layers, especially integrated pretreatment layers.

Found accordingly has been the use of dithiophosphinic acids of the general formula $HS_2P(R^1)(R^2)$ and/or salts thereof for producing chrome-free, polymer-containing corrosion layers on metallic surfaces, $R^1$ and $R^2$ independently of one another each being organic radicals having 1 to 30 C atoms.

In one preferred embodiment of the invention the chrome-free corrosion control layers are applied to metallic surfaces by means of a process which comprises at least the following steps:
(1) treating the metallic surface with a crosslinkable formulation comprising at least
   (A) a polymeric binder,
   (B) crosslinkable components, which can be crosslinkable groups connected to the binder and/or can be at least one additionally employed crosslinker,
   (C) optionally a pigment and/or filler,
   (D) a corrosion preventative, and
   (E) optionally a solvent, and
(2) thermally crosslinking the applied layer,
said corrosion preventative being said dithiophosphinic acids or salts thereof.

In a further-preferred embodiment of the invention the system in question is a radiation-curable system and the process comprises at least the following steps:
(1) treating the metallic surface with a radiation-crosslinkable formulation comprising at least
   (V) at least one crosslinkable component containing radiation-crosslinkable groups,
   (V') optionally at least one reactive diluent,
   (C) optionally a pigment and/or filler,
   (D) a corrosion preventative, and
   (E) optionally a solvent, and
(2) crosslinking the applied layer by means of radiation,
said corrosion preventative being said dithiophosphinic acids or salts thereof.

In an additionally preferred embodiment of the invention the corrosion control layer is an integrated pretreatment layer.

In a further, preferred embodiment of the invention the process for applying chrome-free corrosion control layers to metallic surfaces is one at least comprising the steps of
(1) treating the metallic surface with a formulation which is curable under atmospheric conditions and comprises at least
   (A) a binder system curable under atmospheric conditions,
   (C) optionally a pigment and/or filler,
   (D) a corrosion preventative, and
   (E) optionally a solvent, and
(2) curing the applied layer under atmospheric conditions.

$R^1$ and $R^2$ here, independently of one another, are each organic radicals having 1 to 30 C atoms, preferably 1 to 20 C atoms, and more preferably 1 to 10 C atoms. The radicals may if appropriate also comprise heteroatoms and/or functional groups. They may be straight-chain, branched or cyclic aliphatic radicals, or may be aromatic and/or aralphatic, or arylalkyl, hydrocarbon radicals. Examples of such radicals comprise methyl, ethyl, n-propyl, isopropyl, n-butyl, isobutyl, tert-butyl, n-pentyl, n-hexyl, n-heptyl, n-octyl, n-nonyl, n-decyl, n-dodecyl, 2-ethylhexyl, phenyl or 4-methylphenyl radicals.

Preferably $R^1$ and $R^2$ independently of one another are each a straight-chain, branched or cyclic alkyl radical having 1 to 10 C atoms, more preferably 3 to 8 C atoms. Examples of preferred radicals $R^1$ and $R^2$ respectively comprise n-propyl, isopropyl, n-butyl, isobutyl, tert-butyl, n-pentyl, n-hexyl, n-heptyl, n-octyl, 2-ethylhexyl, cyclopentyl, and cyclohexyl groups.

The preparation of dithiophosphinic acids is known in principle. As an example reference may be made to U.S. Pat. No. 4,308,214.

The dithiophosphinic acids can be used as the free acid and/or in the form of their salts. Examples of suitable salts comprise alkali metal salts, ammonium salts or alkaline earth metal salts, particularly Li, Na, K or $NH_4^+$ salts. The counterions may be organic cations, examples being ammonium cations of the general formula $NR'_4^+$, where the radicals R' independently of one another are each H or an organic radical, in particular a straight-chain or branched alkyl radical having 1 to 20, preferably 1 to 10, C atoms. Examples of suitable radicals comprise methyl, ethyl, n-propyl or n-butyl radicals.

The amount of the dithiophosphinic acids in the corrosion control layer is chosen by the skilled worker in accordance with the desired properties of the layer and is normally from 0.1 to 20% by weight, preferably 0.25 to 10% by weight, in relation to the sum of all components of the layer.

Metallic Substrates

By means of the process of the invention it is possible in principle to protect any metallic bodies from corrosion.

In one embodiment of the invention the bodies in question are stationary metallic constructions such as buildings, bridges, power masts, oil tanks, pipelines, power stations or chemical plant. In the case of this embodiment, corrosion control coatings are typically applied in situ by brushing or spraying. The drying and curing of corrosion control coatings of this kind are accomplished under atmospheric conditions, in other words at ambient temperature and in the presence of air and usual atmospheric moisture. Depending on the degree of control required, the corrosion control of surfaces by means of corrosion control coatings is also referred to as light, medium or heavy duty corrosion control.

In a further embodiment of the invention, sheetlike metallic bodies such as metal sheets, foil, plates and, in particular, metal strips can be provided with an integrated pretreatment layer with particular advantage. Layers of this kind are preferably produced by means of coil coating. Drying and curing are typically performed at relatively high temperatures, as for example in suitable ovens, or else may be performed photochemically using appropriate radiation sources.

As far as the nature of the metal is concerned, any desired metals may be involved in principle. In particular, however, the metals or alloys involved are those which are commonly employed as metallic construction materials and require protection against corrosion.

The surfaces in question are in particular those of iron, steel, Zn, Zn alloys, Al or Al alloys. They may be the surfaces of structures composed entirely of said metals and/or alloys. Alternatively they may be the surfaces of structures only coated with these metals and may themselves be composed of other materials: other metals, alloys, polymers or composites, for example. The surface in question may in particular be that of galvanized iron or steel. In one preferred embodiment of the process it is the surface of a coil metal, in particular electrolytically galvanized or hot-dip-galvanized steel. The metal coil in question may be galvanized on one side or on both sides.

Zn alloys or Al alloys are known to the skilled worker. The skilled worker selects the identity and amount of alloying constituents in accordance with the desired end application. Typical constituents of zinc alloys comprise in particular Al, Pb, Si, Mg, Sn, Cu or Cd. Typical constituents of aluminum alloys comprise in particular Mg, Mn, Si, Zn, Cr, Zr, Cu or Ti. The alloys in question can also be Al/Zn alloys in which Al and Zn are present in approximately equal amounts. Steel coated with such alloys is available commercially. The steel may comprise the customary alloying components known to the skilled worker.

The term "chrome-free corrosion control layer" for the purposes of this invention means that the corrosion control layer of the invention has no chromium compounds added to it, and also that no corrosion-inhibiting pretreatment of the metal surface with chromium compounds is carried out. It will be appreciated that this does not rule out the possible, unintended presence in the corrosion control layer of traces of chromium and/or chromium compounds. Such traces may be formed, for example, if traces of chromium are leached from the metal of a chromium-containing steel in the course of coating.

The corrosion control layer is applied directly to the metal surface—in other words, the metal surface is not provided beforehand with other organic or inorganic layers. It will be appreciated that this does not rule out the additional possible presence on the metal surface of a thin layer which forms unavoidably in the course of normal operations with the metal in the presence of air. As an example, a thin oxide skin may be cited.

The corrosion control layer may, for example, be a temporary corrosion control layer. A temporary corrosion control layer serves for the nonpermanent protection of the metal surface, during transit or storage, for example. The corrosion control layer may additionally be a passivating layer or an integrated pretreatment layer.

Figure 2:
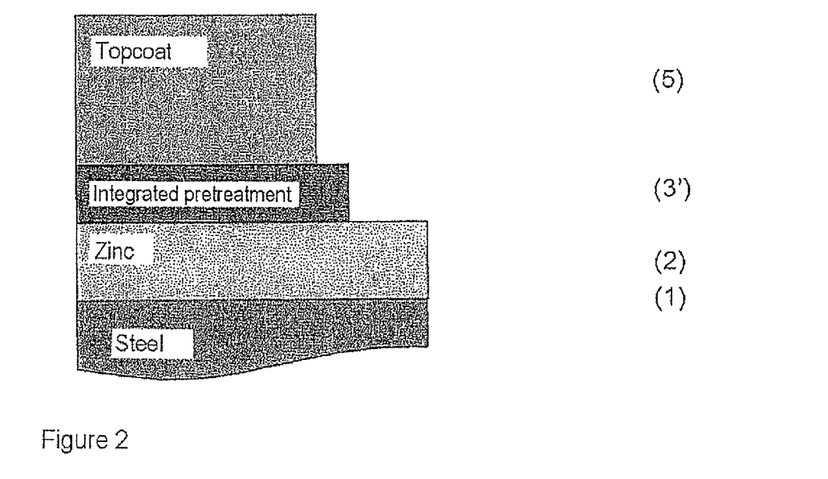
FIG. 2: section through a galvanized steel coil with integrated, one-stage pretreatment.
Details of the invention now follow:
Dithiophosphinic Acids Used In accordance with the invention, dithiophosphinic acids of the general formula $HS_2P(R^1)(R^2)$ are used for producing chrome-free, polymer-containing corrosion control layers on metallic surfaces.

The term "integrated pretreatment layer" has already been defined at the outset. An integrated pretreatment layer combines the passivating layer with the organic primer in a single layer. This is also depicted in FIG. 2. Atop an integrated pretreatment layer it is possible for further coating layers, such as cathodic electrocoat materials, for example, to be applied directly without the need for an additional organic primer coat to be applied beforehand. It will be appreciated, however, that an additional organic primer coat is possible in special cases, though preferably is absent.

The thickness of the corrosion control layer is chosen by the skilled worker in accordance with the desired application. Details are given below.

Binders

The corrosion control layers further comprise at least one polymeric binder (A). As will be appreciated, they may also comprise a mixture of different polymeric binders (A). The binder can be in polymerized form from the start, i.e., can already be in the form of polymer in the formulation employed for applying the corrosion coat, or else the formulation may comprise monomers and/or prepolymers, with crosslinking to a binder taking place only after the formulation has been applied to the metal surface. The latter is the case in particular with radiation-curable systems.

The polymeric binder (A) may comprise, for example, poly(meth)acrylic acid, or, preferably, copolymers of (meth) acrylic acid and other monomers which comprise an ethylenically unsaturated group and acidic groups. Examples of suitable comonomers include vinyl acetic acid, crotonic acid or isocrotonic acid, unsaturated acids containing two COOH groups such as maleic acid or fumaric acid, acids containing phosphonic acid groups, such as vinylphosphonic acid, allylphosphonic acid or 3-butenylphosphonic acid, acids containing phosphoric acid groups, such as monovinyl phosphate, monoallyl phosphate, mono-3-butenyl phosphate or phosphonoxyethyl(meth)acrylate, or acids containing sulfonic acid groups, such as styrenesulfonic acid. Preferably such copolymers comprise at least 50% by weight of (meth) acrylic acid, 5% to 50% by weight of other, more acidic monomers, and up to 30% by weight of monomers different from these. Chlorinated monomers, such as vinyl chloride or vinylidene chloride, for example, are preferably not used.

For applying the layer it is usual to prepare a suitable formulation from the polymeric binder, the dithiophosphinic acid, and, optionally, further components and to use it to treat the metallic surface. The formulation preferably comprises a suitable solvent included; alternatively, it may be applied as a powder coating formulation. The skilled worker is aware of how thin corrosion control layers may be applied.

The binders may be thermally and/or photochemically crosslinkable binder systems. Systems of this kind come into play in particular in the context of coil coating. Additionally, they may be systems which are curable under atmospheric conditions, these systems being used primarily in corrosion control paints.

Crosslinkable Formulation

In one preferred embodiment of the invention the dithiophosphinic acids can be used for applying chrome-free integrated pretreatment layers, in particular by means of coil coating. For this purpose a formulation is used which is crosslinkable—preferably thermally and/or photochemically. To this end the formulation comprises crosslinkable components.

In one embodiment of the invention the formulation in question comprises at least one binder (A) and also crosslinkable components (B). The crosslinkable components may comprise at least one crosslinker, which is used in addition to a binder, or may comprise crosslinkable groups which are connected to the binder. It will be appreciated that the binder may also contain crosslinkable groups and that a crosslinker may be used additionally.

The type of crosslinking is not restricted. By way of example, the crosslinking may be performed thermally or photochemically. It will be appreciated that combinations are possible as well, with the proviso that no unwanted effects occur. The type of crosslinking groups can be selected by the skilled worker depending on the desired crosslinking technology and in accordance with the desired outcome.

A variety of possible combinations are conceivable in the arrangement of the crosslinked groups. By way of example, binder and crosslinker can be used separately from one another. In that case the binder comprises reactive functional groups which are able to react with complementary reactive functional groups in the crosslinkers. Alternatively the binders may also be self-crosslinking binders, comprising reactive functional groups which are able to enter into crosslinking reactions with groups of their own kind ("with themselves") or with complementary reactive functional groups on the same polymer. It is also possible for exclusively the crosslinkers to react with one another.

Binders (A) and Crosslinking Components (B)

The binders (A) can be the binders customary in the field of coil coating materials as well as the binders mentioned at the outset. Examples of suitable binders comprise (meth)acrylate (co)polymers, partially hydrolyzed polyvinyl esters, polyesters, alkyd resins, polylactones, polycarbonates, polyethers, epoxy resin-amine adducts, polyureas, polyamides, polyimides or polyurethanes. It will be appreciated that mixtures of different polymers can also be used, provided the mixture does not give rise to any unwanted effects. Chlorinated polymers are preferably not used.

Preference is given to using polyesters or epoxy resin-amine adducts. The polyesters are suitable particularly for weldable coating materials and the epoxy resin-amine adducts are preferred for coating materials which are not to be welded.

Suitable polyesters include in particular condensates of low molecular mass dicarboxylic acids and dialcohols. Examples of suitable dicarboxylic acids comprise aliphatic dicarboxylic acids such as adipic acid, azelaic acid, sebacic acid and dodecanedioic acid, aliphatically cycloaliphatics such as dimer fatty acids, i.e., reaction products of unsaturated fatty acids with one another, cycloaliphatic dicarboxylic acids such as 1,4- or 1,3-cyclohexanedicarboxylic acid and tricyclodecanedicarboxylic acid, and aromatic dicarboxylic acids such as isophthalic acid, terephthalic acid or phthalic acid. As will be appreciated, it is also possible to use derivatives of dicarboxylic acids. Particularly suitable are anhydrides such as phthalic anhydride, hexahydrophthalic anhydride or tetrahydrophthalic anhydride, for example.

Examples of suitable dialcohols comprise aliphatic alcohols such as ethylene glycol, diethylene glycol, triethylene glycol, propylene glycol, 1,3-butanediol, 1,3-propanediol, 1,4-butanediol, neopentyl glycol, 1-methylpropane-1,3-diol, 2-butyl-2-ethylpropanediol, pentanediols, hexanediols, octanediols, dodecanediol, neopentyl glycol hydroxypivalate, cycloaliphatic alcohols such as 1,4- or 1,3-cyclohexanedimethanol, TCD alcohol and bis(4-hydroxycyclohexyl)mnethane and/or propane, and dimer diols (hydrogenated dimer fatty acids). As will be appreciated, it is also possible in a known way to use derivatives of alcohols, such as esters, for example, especially the corresponding methyl or ethyl esters.

Besides linear binders it is also possible to use branched binders. Suitable monomers for producing branches comprise tricarboxylic acids or their anhydrides such as trimellitic anhydride or trimeric acid and trialcohois such as trimethalyolalkanes, an example being trimethylolethane or trimetyloipropane.

With preference it is possible to convert the polyesters to isocyanate-terminated polyesters, in whole or in part, by reaction with polyisocyanates.

The OH number of the polyesters used is usually from about 10 to about 200 mg KOH/g, preferably from 15 to 120 mg KOH/g, more preferably from 20 to 80 mg KOH/g and for example about 50 mg KOH/g. The molecular weights are usually from 400 to 10 000 g/mol, preferably from 500 to 5000 g/mol and more preferably from 1000 to 4000 g/mol.

Epoxy-functional polymers can be prepared by reacting epoxy-functional monomers such as bisphenol A diglycidyl ether, bisphenol F diglycidyl ether or hexanediol diglycidyl ether with phenols such as bisphenol A, bisphenol F and/or alcohols such as ethoxylated or propoxylated bisphenol A. Epoxy-functional polymers are available commercially, under the name Epon® or Epikote®, for example.

Epoxy resin-amine adducts can be obtained by reacting said epoxy-functional components with phenols and/or with aliphatic or cycloaliphatic dicarboxylic acids, acidic polyesters or alcohols, thiols and also amines, particularly secondary amines such as diethanolamine or N-methylbutanolamine, for example.

It is additionally possible to use emulsion polymers as well. These polymers are particularly suitable for water-based formulations. Examples of suitable emulsion polymers or copolymers comprise acrylate dispersions, obtainable in conventional manner from acrylic acid and/or acrylic acid derivatives, examples being acrylic esters, and/or styrene. Dispersions of polyurethanes are suitable as well, prepared from aromatic and/or aliphatic diisocyanates and polyesters or aliphatic soft segments.

The amount of binders used is determined by the skilled worker in accordance with the desired properties of the layer. Preferably the formulation employed comprises from 20 to 70% by weight of the binder. All percentages by weight refer below to the sum of all of the components of the formulation bar the solvent or solvent mixture. More preferably the amount is from 30 to 60% by weight and very preferably from 40 to 50% by weight.

The crosslinking components (B) may have thermally crosslinking groups or photochemically crosslinking groups.

Suitable thermal crosslinkers are, for example, crosslinkers based on epoxides, in which two or more epoxy groups are joined to one another by means of a linking group. Examples comprise low molecular mass compounds having two epoxy groups such as hexanediol diglycidyl ether, phthalic acid diglycidyl ether or cycloaliphatic compounds such as 3,4-epoxycyclohexylmethyl 3',4'-epoxycyclohexanecarboxylate. Other examples of suitable crosslinkers comprise melamine-based crosslinkers.

Particular preference is given to using blocked polyisocyanate thermal crosslinkers. On blocking, the isocyanate group is reacted reversibly with a blocking agent. On heating to higher temperatures, the blocking agent is eliminated again. Examples of suitable blocking agents are disclosed in DE-A 199 14 896, column 12 line 13 to column 13 line 2. Particular preference is given to using polyisocyanates blocked with ε-caprolactam.

Crosslinkers suitable for photochemical crosslinking are, in particular, compounds having two or more ethylenically unsaturated groups, especially difunctional or polyfunctional acrylates such as, for example, butanediol diacrylate, hexanediol diacrylate or trimethylolpropane triacrylate.

If a crosslinker is used separately it is usual to use from 0.5 to 10% by weight, preferably from 1 to 8% by weight and more preferably from 2 to 6% by weight. It will be appreciated that mixtures of different crosslinkers can also be used, provided that the properties of the layer are not adversely affected as a result.

Radiation-Curable Systems

In a further embodiment of the invention the system is a radiation-curable system. Used for this purpose are formulations which in addition to the inventively used corrosion inhibitors comprise one or, preferably two or more low molecular mass, oligomeric and/or polymeric radiation-curable components which on radiation curing form a polymeric binder matrix. The curing in this case is triggered by high-energy radiation, examples being UV, VIS, NIR or electron radiation. It will be appreciated that combined techniques are possible as well, in which case irradiation and heating are carried out simultaneously or in succession.

Crosslinkable Components (V)

The formulations employed comprise at least one crosslinkable component (V), having at least two crosslinkable groups. The compounds in question here are generally oligomeric or polymeric compounds. In addition it is possible for reactive diluents (V') to be present as well. Reaction diluents may contain one or else two or more crosslinkable groups. They are generally monomers. Reactive diluents have a lower viscosity than the oligomeric or polymeric crosslinkers, and therefore play the part of a diluent in a radiation-curable system.

The nature of the radiation-curable groups is not restricted, although they are preferably groups containing ethylenically unsaturated groups. By way of example these may be (meth)acrylate groups, fumarate groups, maleate groups or crotonate groups. Groups of this kind can be obtained, for example, by reacting α,β-ethylenically unsaturated monocarboxylic and/or dicarboxylic acids or their anhydrides with co-reactants that possess groups able to react with the carboxylic acid groups. The co-reactants, for example, may have OH groups or $NH_2$ groups, which react with the carboxylic acids and/or their derivatives to form carboxylic esters or carboxamides, respectively. Carboxylic acids which can be used include, for example, (meth)acrylic acid, maleic acid, maleic anhydride, fumaric acid, crotonic acid or itaconic acid.

The radiation-curable groups are preferably (meth)acrylate groups, more preferably acrylate groups.

Polyfunctional (meth)acrylates

As crosslinking components it is possible for example to use polyfunctional (meth)acrylates which have at least 2, preferably 3 to 10 and more preferably 3 to 6 (meth)acrylate groups.

These may be, for example, esters of (meth)acrylic acid with at least dihydric polyalcohols, such as, for example, polyols, polyetherols or polyesterols or polyacrylate polyols having an average OH functionality of at least 2, preferably 3 to 10.

The alcohol components may for example be alkoxylated products obtainable from the corresponding diols or polyols by alkoxylation in a manner known in principle. The (meth)acrylates in question are preferably those of singly to trigintuply and more preferably triply to vigintupiy ethoxylated, propoxylated or mixedly ethoxylated and propoxylated, and in particular exclusively ethoxylated, neopentyl glycol, trimethyloipropane, trimethylolethane or pentaerythritol.

The polyfunctional (meth)acrylates can also be esters and amides of amino alcohols with the aforementioned α,β-ethylenically unsaturated monocarboxylic and/or dicarboxylic acids, or hydroxyalkyl vinyl ethers such as hydroxybutyl vinyl ether, for example.

The simple polyfunctional (meth)acrylates described, formed from (meth)acrylate groups and also alcohols or alkoxylated alcohols, can be used as the sole crosslinking components. Their amount in general is 0% to 80% by weight, and relative to the sum of all of the components of the formulation. Alternatively and preferably they can be used in a mixture with other crosslinking components.

Other crosslinking components for performing the present invention may in particular be polyfunctional(meth)acrylates selected from the group of urethane(meth)acrylates, epoxy(meth)acrylates, polyether(meth)acrylates, polyester (meth)acrylates or polycarbonate(meth)acrylates. It will be appreciated that mixtures of these can also be used. Preference is given to using urethane(meth)acrylates.

Urethane(meth)acrylates

Urethane(meth)acrylates are obtainable for example by reacting polyisocyanates with hydroxyalkyl(meth)acrylates or hydroxyalkyl vinyl ethers and, if appropriate, chain extenders such as diols, polyols, diamines, polyamines or dithiols or polythiols.

Urethane(meth)acrylates of this kind comprise as synthesis components substantially:

(U1) at least one organic aliphatic, aromatic or cycloaliphatic di- or polyisocyanate
(U2) at least one compound having at least one isocyanate-reactive group and at least one free-radically polymerizable unsaturated group, and
(U3) optionally at least one compound having at least two isocyanate-reactive groups.

Component (U1) comprises typical aliphatic, aromatic and/or cycloaliphatic diisocyanates and/or polyisocyanates, preferably those having 4 to 20 C atoms. It is likewise possible to use mixtures of different isocyanates.

Examples of isocyanates of this kind comprise typical aliphatic diisocyanates such as 1,4-tetramethylene diisocyanate, 1,6-hexamethylene diisocyanate, 1,8-octamethylene diisocyanate, 1,10-decamethylene diisocyanate, 1,12-dodecamethylene dilsocyanate, tetradecamethylene diisocyanate, cycloaliphatic diisocyanates such as 1,4-, 1,3- or 1,2-dilsocyanatocyclohexane, 4,4'- or 2,4'-di(isocyanatocyclohexyl)methane, isophorone diisocyanate, 1,3- or 1,4-bis (isocyanatome, thylcyclohexane or aromatic diisocyanates such as 2,4- or 2,6-tolylene diisocyanate, 2,4'- or 4,4'-dilsocyanatodiphenylmethane, 1,3- or 1,4-phe-nylene diisocyanate, 1,5-naphthylene diisocyanate, diphenylene-4,4'-diicocyanate, 4,4'-diisocyanato-3,3'-dimethyldiphenyl diisocyanate, 3-methyldiphenylmethane 4,4'-diisocyanate or diphenyl ether 4,4'-diisocyanate.

Examples of polyisocyanates are those polyisocyanates which are derived from the stated diisocyanates and comprise isocyanurate, biuret, uretdione, iminooxadiazinetrione and/or carbodiimide groups.

For performing the present invention it is preferred to use aliphatic diisocyanates, preferably aliphatic isocyanates having 4 to 20 C atoms.

As component (U2) it is possible for example to use esters of dihydric or polyhydric alcohols with α,β-ethylenically unsaturated monocarboxylic and/or dicarboxylic acids and their anhydrides, in each case with the proviso that at least one of the OH groups present in the alcohol remains unesterified. Examples of such carboxylic acids and also such alcohols have already been given above.

Preferably the compounds (U2) are selected from 2-hydroxyethyl acrylate, 2-hydroxyethyl methacrylate, 2-hydroxypropyl acrylate, 2-hydroxypropyl methacrylate, 3-hydroxybutyl acrylate, 3-hydroxybutyl methacrylate, 4-hydroxybutyl acrylate, 4-hydroxybutyl methacrylate, 6-hydroxyhexyl acrylate, 6-hydroxyhexyl methacrylate, 3-hydroxy-2-ethyl hexacrylate, 3-hydroxy-2-ethylhexyl methacrylate, trimethyloipropane monoacrylate or diacrylate, pentaerythritol diacrylate or triacrylate, and mixtures thereof.

The optional component (U3) is at least one compound having at least two groups reactive toward isocyanate groups and selected from hydroxyl, mercapto, and primary and/or secondary amino groups. Compounds of this kind serve for chain extension.

Suitable compounds (U3) are both low molecular mass alcohols and polymeric polyols.

Low molecular mass alcohols have a molecular weight of not more than 500 g/mol. Particularly preferred alcohols are those having 2 to 20, preferably 4 to 20 carbon atoms and 2 to 6 hydroxyl groups. Examples of preferred diols comprise 1,2-, 1,3- or 1,4-butanediol, 1,4-pentanediol, 1,5-pentanediol, 1,6-hexanediol, 2,5-hexanediol, dihydroxymethyicyclohexane or bishydroxycyclo-hexylpropane.

The number-average molecular weight $M_n$ of polymeric polyols employed with preference is in the range from about 500 g/mol to 100 000 g/mol, with particular/preference from 500 g/mol to 10 000 g/mol. The OH numbers are situated preferably in a range from about 20 to 300 mg KOH/g polymer.

Examples of preferred polymeric polyols comprise copolymers which comprise in copolymerized form at least one of the OH-containing esters mentioned above in connection with (U2), and at least one further comonomer, preferably selected from vinylaromatics, such as styrene, esters of the aforementioned α,β-unsaturated monocarboxylic and/or dicarboxylic acids with monoalcohols, vinyl esters of carboxylic acids comprising up to 20 carbon atoms, vinyl halides, nonaromatic hydrocarbons having 4 to 8 carbon atoms and 1 or 2 double bonds, unsaturated nitriles, and mixtures thereof. They additionally include (partly) hydrolyzed vinyl ester polymers, preferably polyvinyl acetates.

Further included here are polyesterols based on aliphatic, cycloaliphatic and/or aromatic di-, tri- and/or polycarboxylic acids with di-, tri- and/or polyols, and also lactone-based polyesterols.

Polyesterpolyols are known for example from Ullmanns Encycloädie der technischen Chemie, 4th edition, volume 19, pages 62 to 65. Preference is given to using polyesterpolyols which are obtained by reacting dihydric alcohols with dibasic carboxylic acids. Instead of the free polycarboxylic acids it is also possible to use the corresponding polycarboxylic anhydrides or corresponding polycarboxylic esters of lower alcohols or mixtures thereof to prepare the polyester polyols. The polycarboxylic acids may be aliphatic, cycloaliphatic, araliphatic, aromatic or heterocyclic and may if appropriate be substituted—by halogen atoms for example—and/or unsaturated.

Preferred dicarboxylic acids are of the general formula HOOC—$(CH_2)_y$—COOH, y being a number from 1 to 20, preferably an even number from 2 to 20, and with particular preference succinic acid, adipic acid, sebacic acid, and dodecanedicarboxylic acid. Preferred alcohols are of the general formula HO—$(CH_2)_x$—OH, x being a number from 1 to 20, preferably an even number from 2 to 20. Preference is given to ethylene glycol, butane-1,4-diol, hexane-1,6-diol, octane-1,8-diol, and dodecane-1,12-diol. Additionally preferred is neopentyl glycol. Also suitable are polycarbonate diols, of the kind obtainable for example by reacting phosgene with an excess of the low molecular mass alcohols specified as synthesis components for the polyester polyols.

Also suitable are lactone-based polyester diols, which are homopolymers or copolymers of lactones, preferably hydroxyl-terminated adducts of lactones with suitable difunctional starter molecules.

Also possible for use as (U3) are polyetherols, which are obtainable by polymerizing cyclic ethers or by reacting alkylene oxides with a starter molecule, and also α,ω-diaminopolyethers obtainable by reacting polyetherols with ammonia. Products of this kind are available commercially as Jeffamine® (from Huntsman).

The abovementioned components (U3) may be used individually or as mixtures for the synthesis of the urethane (meth)acrylates.

The urethane(meth)acrylates preferably have a number-average molecular weight $M_n$ of 500 g/mol to 20 000 g/mol, in particular of 500 g/mol to 10 000 g/mol, with particular preference 600 g/mol to 3000 g/mol, and a (meth)acrylic group content of 1 to 5, more preferably of 2 to 4, mel of (meth)acrylate groups per 1000 g of urethane(meth)acrylate.

Particularly preferred urethane(meth)acrylates have an average (meth)acrylate functionality of 2 to 10.

Polyester(meth)acrylates

Polyester(meth)acrylates suitable for performing the present invention can be obtained in a manner known in principle by reacting the polyester polyols, mentioned above as component (U3), with (meth)acrylic acid. For the esterification of (meth)acrylic acid with the hydroxy compound, the methods that are known to the skilled worker are suitable.

In the esterification of (meth)acrylic acid with the hydroxy compound it is preferred to use 0.1 to 1.5, more preferably 0.5 to 1.4, and very preferably 0.7 to 1.3 equivalents of (meth)acrylic acid per hydroxy equivalent of the hydroxy compounds. The reaction of the (rneth)acrylic acid with the hydroxy compounds can be performed for example in the presence of a typical, acidic esterification catalyst, and water of reaction formed can be removed by means of typical methods. In order to avoid premature polymerization it is advisable to carry out the reaction of (meth)acrylic acid in the presence of small amounts of typical inhibitors in order to prevent thermal polymerization.

After the esterification, the solvent, the hydrocarbon for example, can be removed from the reaction mixture distillatively, if appropriate under reduced pressure. The esterification catalyst can be neutralized in a suitable way, such as by adding tertiary amines or alkali metal hydroxides. Excess (meth)acrylic acid, too, can be removed in part for example by distillation under reduced pressure.

To prepare polyester(meth)acrylates it is possible to introduce the (meth)acrylic acid together with starting materials of the hydroxy-containing polyester, such as dicarboxylic acids or their anhydrides and dials and/or polyols, for example, and to react the starting materials together with the (meth)acrylic acid in one stage.

Epoxy(meth)acrylates

Epoxy(meth)acrylates used for performing the present invention are obtainable preferably by reacting epoxides with (meth)acrylic acid. Examples of suitable epoxides include epoxidized olefins, aromatic glycidyl ethers or aliphatic glycidyl ethers, preferably those of aromatic or aliphatic glycidyl ethers. Examples of preferred epoxidized olefins comprise ethylene oxide, propylene oxide, isobutylene oxide, vinyioxirane, styrene oxide or epichlorohydrin, particular preference being given to ethylene oxide, propylene oxide or epichlorohydrin, and very particular preference to ethylene oxide or epichlorohydrin.

Examples of preferred aromatic glycidyl ethers comprise bisphenol A diglycidyl ether, bisphenol F diglycidyl ether, bisphenol B diglycidyl ether, bisphenol S diglycidyl ether, particular preference being given to bisphenol A diglycidyl ether, preferred aliphatic glycidyl ethers being for example 1,4-butanediol diglycidyl ether, 1,6-hexanediol diglycidyl ether, trimethyloipropane triglycidyl ether, pentaerythritol tetraglycidyl ether, and (2,2-bis[4-(2,3-epoxypropoxy)cyclohexyl]propane.

Particular preference is given to the abovementioned aromatic glycidyl ethers.

The epoxy(meth)acrylates and epoxy vinyl ethers preferably have a number-average molecular weight $M_n$ of 200 g/mol to 20 000 g/mol, more preferably of 200 g/mol to 10 000 g/mol, and very preferably of 250 g/mol to 3000 g/mol; the amount of (meth)acrylic groups or vinyl ether groups is preferably 1 to 5, more preferably 2 to 4 per 1000 g of epoxy(meth)acrylate or vinyl ether epoxide.

Preferred epoxy(meth)acrylates have an OH number of 40 to 400 mg KOH/g and an average (meth)acrylate functionality of 2 to 8.

Particularly preferred epoxy(meth)acrylates are those as obtained from processes according to EP-A 54 105, DE-A 33 16 593, EP-A 680 985, and EP-A 279 303, in which in a first stage a (meth)acrylic ester is prepared from (meth)acrylic acid and hydroxy compounds and in a second stage excess (meth)acrylic acid is reacted with epoxides.

Carbonate(meth)acrylates

Carbonate(meth)acrylates suitable for performing the present invention comprise on average preferably 2 to 5, especially 2 to 4, more preferably 2 to 3 (meth)acrylic groups and, with very particular preference, 2 (meth)acrylic groups.

The number-average molecular weight $M_n$ of the carbonate (meth)acrylates is preferably less than 3000 g/mol, more preferably less than 1500 g/mol, with particular preference less than 800 g/mol.

The carbonate (meth)acrylates are obtainable in a simple way by transesterification of carbonic esters with polyhydric, preferably dihydric, alcohols (diols, hexanediol for example) and subsequent esterification of the free OH groups with (meth)acrylic acid or else transesterification with (meth)acrylic esters, as is described for example in EP-A 92 269. They are also obtainable by reacting phosgene, urea derivatives with polyhydric—for example, dihydric—alcohols.

In a similar way it is also possible to obtain vinyl ether carbonates, by reacting a hydroxyalkyl vinyl ether with carbonic esters and also, if appropriate, dihydric alcohols.

Also conceivable are (meth)acryiates or vinyl ethers of polycarbonate polyols, such as the reaction product of one of the aforementioned diols or polyols and a carbonic ester and also a hydroxyl-containing (meth)acrylate or vinyl ether.

Examples of suitable carbonic esters include ethylene carbonate, 1,2- or 1,3-propylene carbonate, dimethyl carbonate, diethyl carbonate or dibutyl carbonate.

Examples of suitable hydroxyl-containing (meth)acrylates are 2-hydroxyethyl(meth)acrylate, 2- or 3-hydroxypropyl (meth)acrylate, 1,4-butanediol mono(meth)acrylate, neopentyl glycol mono(meth)acrylate, glycerol mono (meth)-acrylate and di(meth)acrylate, trimethyloipropane mono(meth)acrylate and di(meth)acrylate, and pentaerythritol mono(meth)acrylate, di(meth)acrylate, and tri(meth) acrylate.

Suitable hydroxyl-containing vinyl ethers are, for example, 2-hydroxyethyl vinyl-ether and 4-hydroxybutyl vinyl ether.

Particularly preferred carbonate (meth)acrylates are those of the formula:

in which R is H or $CH_3$, X is a $C_2$-$C_{13}$ alkylene group, and n is an integer from 1 to 5, preferably 1 to 3.

R is preferably H and X is preferably $C_2$ to $O_{10}$ alkylene, such as 1,2-ethylene, 1,2-propylene, 1,3-propylene, 1,4-butylene or 1,6-hexylene, more preferably $C_4$ to $C_8$ alkylene. With very particular preference X is $C_6$ alkylene.

The carbonate (meth)acrylates are preferably aliphatic carbonate (meth)acrylates.

Also included among these, furthermore, are typical polycarbonates, known to the skilled worker, which have terminal hydroxyl groups, these being obtainable, for example, by reaction of the abovementioned diols with phosgene or carbonic diesters.

Polyether (meth)acrylates

Polyether (meth)acrylates are, for example, mono(meth) acrylates of polyTHF having a molar weight between 162 and 2000, poly-1,3-propanediol with a molar weight between 134 and 2000, or polyethylene glycol with a molar weight between 238 and 2000.

Reactive diluents (V')

In the photochemically crosslinkable formulations use may also be made, optionally, alongside the stated crosslinkable components, of typical reactive diluents (V'). Reactive diluents generally have 1 to 6 ethylenically unsaturated double bonds. They serve to influence the density of crosslinking and in radiation-curable systems may also function as solvents for adjusting the viscosity of the preparation. Suitable reactive diluents are known to the skilled worker. The reactive diluents preferably have only one crosslinkable group. It is of course possible to use mixtures of two or more different reactive diluents.

Examples of suitable reactive diluents comprise, in particular, (meth)acrylic esters such as (meth)acrylic acid methyl esters, (meth)acrylic acid ethyl esters, such as, for example, 2-hydroxyethyl (meth)acrylate, hydroxypropyl (meth)acrylate, tart-butylcyclohexyl(meth)acrylate, phenoxyethyl(meth)acrylate, trimethylolpropane formal mono (meth)acrylate, ethylene glycol di(meth)acrylate, isobornyl acrylate, dipropylene glycol diacrylate, tripropylene glycol diacrylate, trimethylolpropane triacrylate, hexanediol diacrylate, lauryl acrylate, vinyl ethers such as methyl vinyl ether, ethyl vinyl ether or else styrene. Further examples are disclosed in P. K. T. Oldring (editor), Chemistry and Technology of UV & EB Formulations for Coatings, Inks & Paints, vol. II, chapter III: Reactive Diluents for UV and EB Curable Formulations, Wiley and SITA Technology, London, 1997.

The amount of such reactive diluents (V') is generally 20% to 90% by weight relative to the amount of all of the components of the formulation.

Photoinitiators

The photochemically crosslinkable formulation employed further comprises in general one or more photoinitiators, which are able to initiate the polymerization of the crosslinkable groups—as a general rule, by means of free-radical polymerization. Where electron-beam curing is carried out, there is no need to add them.

The polymerization can be initiated by means of high-energy radiation, as for example by means of UV radiation, UV/VIS radiation or NIR radiation. The skilled worker selects an appropriate photoinitiator in accordance with the desired wavelength range. It is of course also possible to use mixtures of different photoinitiators.

Suitable photoinitiators are known in principle to the skilled worker, for example those specified in "Advances in Polymer Science", volume 14, Springer Berlin, 1974 or in K. K. Dietliker, Chemistry and Technology of UV- and EB-Formulation for Coatings, Inks and Paints, volume 3; Photoinitiators for Free Radical and Cationic Polymerization, P. K. T. Oldring (Eds), SITA Technology Ltd, London.

Examples of suitable photoinitiators comprise mono- or bisacyiphosphine oxides, as described for example in EP-A 7 508, EP-A 57 474, DE-A 196 18 720, EP-A 495 751 or EP-A 615 980. Examples of preferred photoinitiators comprise 2,4,6-trimethylbenzoyldiphenylphosphine oxide, ethyl 2,4,6-trimethylbenzoyl-phenylphosphinate, bis(2,4,6-trimethylbenzoyl)phenylphosphine oxide, benzophenone, 1-benzoylcyclohexan-1-ol, 2-hydroxy-2,2-dimethylacetopherione, and 2,2-dimethoxy-2-phenylacetophenone.

Typical mixtures comprise, for example, 2-hydroxy-2-methyl-1-phenylpropan-2-one and 1-hydroxycyclohexyl phenyl ketone, bis(2,6-dimethoxybenzoyl)-2,4,4-trimethylpentylphosphine oxide and 2-hydroxy-2-methyl-1-phenylpropan-1-one, benzophenone and 1-hydroxycyclohexyl phenyl ketone, bis(2,6-dimethoxybenzoyl)-2,4,4-trimethylpentylphosphine oxide and 1-hydroxycyclohexyl phenyl ketone, 2,4,6-trimethylbenzoyldiphenylphosphine oxide and 2-hydroxy-2-methyl-1-phenylpropan-1-one, 2,4,6-trimethylbenzophenone and 4-methylbenzophenone, or 2,4,6-trimethylbenzophenone and 4-methylbenzophenone and 2,4,6-trimethylbenzoyldiphenylphosphine oxide.

The amount of the photoinitiators is generally higher for the process of the invention than in typical UV applications, and is determined by the skilled worker in accordance with the desired application, such as in accordance with the reactivity of the crosslinkable components used, or according to whether curing takes place under inert conditions or not. The amount is generally 1% to 20%, preferably 2% to 18%, and more preferably 3% to 15% by weight, relative to the sum of all of the components of the formulation. It can also amount to just 1% to 2% by weight, particularly in the case of very reactive crosslinkable components and/or when curing under inert conditions.

Atmospherically Curable Systems

In a further preferred embodiment of the invention the dithiophosphinic acids are used to apply corrosion control layers that are curable under atmospheric conditions. For this purpose the formulation comprises a binder system which is curable under atmospheric conditions.

Binder systems curable under atmospheric conditions may be the binder systems that are typical in the field of corrosion control paints and coatings. Binders and binder systems of this kind are known in principle to the skilled worker. It will be appreciated that it is also possible to use mixtures of different binder systems, provided that such mixing does give rise to any unwanted effects.

The term "binder system" refers below, in a manner known in principle, to those fractions of the formulation that are responsible for film formation.

The term "curable under atmospheric conditions" means that the binder systems have the capacity, following application to the surface under typical ambient conditions, i.e., approximately at room temperature, in the presence of air and also typical atmospheric humidity, to cure without the use of additional apparatus or equipment. Typical curing temperatures, depending on the environment, are more than 0 to 40° C., preferably 5 to 35° C., and, for example, 15 to 25° C. It is clear to the skilled worker that the time to complete curing of a given binder system may differ according to the ambient conditions actually prevailing.

Curing may proceed by a variety of mechanisms, depending on the nature of the binder system employed. By way of example the curing involved may be purely physical curing, produced by the evaporation of the solvent used. It may also be an oxidative curing through reaction of the binder system with the oxygen in the air. Finally, it may also be a chemical crosslinking (reactive crosslinking). Reactive binder systems comprise crosslinkable components. The crosslinkable components may be of low molecular mass, oligomeric or polymeric. The systems in question may be preferably one-component (1 K) or else two-component (2 K) systems. Reactively crosslinking systems also comprise moisture-curing binder systems, where the atmospheric moisture functions as a curing component. It will be appreciated that a binder system may also cure through a combination of different curing methods. In the case of 2 K systems the binder component and curing component are mixed, in a way which is known in principle, before the formulation is used.

The invention can be performed using aqueously soluble or organically soluble binder systems. Preference is given to binder systems on an aqueous basis.

Binder systems for corrosion control coatings, especially corrosion control systems on an aqueous basis, are known in principle to the skilled worker. They may for example be epoxy resins, polyacrylates, styrene-acrylate polymers, polyesters, alkyd resins, polyurethanes or styrene-butadiene polymers.

For atmospherically curable systems the amount of binders (A) in the formulation is generally 15% to 70% by weight, based on the amount of all of the components of the formulation, including the solvent. It is set by the skilled worker in accordance with the desired properties of the coating. The amount is preferably 20% to 60% by weight and more preferably 25% to 50% by weight.

Preferred binder systems for atmospherically curable systems are described below.

Polyacrylates or Styrene-Acrylate Copolymers (A1)

In one preferred embodiment of the invention the binder system for atmospherically curable systems is an aqueous or predominantly aqueous dispersion of polyacrylates or styrene-acrylate copolymers (A1).

Aqueous dispersions of polyacrylates or styrene-acrylate copolymers (A1) for preparing corrosion control paints are known in principle to the skilled worker. The aqueous dispersions of the polyacrylates (A1) may be either primary dispersions or secondary dispersions. Suitable polyacrylates comprise as principal monomers at least one alkyl (meth)acrylate such as, for example, methyl (meth)acrylate, ethyl (meth)acrylate, butyl (meth)acrylate or 2-ethylhexyl (meth)acrylate. They can have preferably as further principal monomers vinylaromatics, especially styrene. The amount of the principal monomers together is in general at least 60% by weight, preferably at least 80% by weight. Styrene-acrylate copolymers comprise in addition to the stated alkyl (meth)acrylates as principal monomer in general at least 30% by weight, preferably at least 40% by weight, and more preferably about 50% by weight of styrene. The polyacrylates or styrene-acrylate copolymers (A1) may additionally have further comonomers as well, particularly those containing functional groups such as hydroxyl, carboxyl or carboxamide groups. Examples comprise (meth)acrylio acid, itaconic acid, maleic acid, fumaric acid, (meth)acrylamide or hydroxyalkyl (meth)acrylates. Further comonomers are preferably acidic comonomers. In addition it is also possible, optionally, for crosslinking monomers to be present as well in small amounts, typically less than 4% by weight, preferably less than 2% by weight. Examples comprise butanediol(meth)acrylate, hexanediol di(meth)acrylate or allyl acrylate.

Polyacrylates (A1) can be prepared in a way which is known in principle by means of emulsion polymerization. Further details of such polymers and of their preparation are disclosed for example in EP-A 157 133, WO 99/46337, or in "Paints and Coatings, 2.5. Acrylic Coatings" in Ullmann's Encyclopedia of Technical Chemistry, 6th Edition 2000, Electronic Release. The skilled worker makes an appropriate selection from the polyacrylates (M) possible in principle, in accordance with the desired properties of the layer.

Especially suitable for performing the invention are styrene-acrylate copolymers which comprise as principal monomers at least one elastomeric acrylate such as, for example, n-butyl (meth)acrylate, n-hexyl (meth)acrylate, n-octyl acrylate or 2-ethylhexyl (meth)acrylate in a mixture with styrene and also, as secondary monomer, at least one acidic monomer, such as (meth)acrylic acid, for example. For use as binders for the formulation it is possible for some or all of the acid groups to be neutralized with suitable bases, such as, for example, ammonia.

The polyacrylates employed ought in general to have a glass transition temperature, $T_g$, in the range from 0 to 60° C., preferably in the range from 5 to 40° C. (measured by the DSC method in accordance with DIN EN ISO 11357). The glass transition temperature may be chosen by the skilled worker, in a way which is known in principle, through the selection and the proportion of hard monomers and soft monomers.

With preference for performing the invention it is possible additionally to use polyacrylates (A1) having an average particle size of 50 nm to 400 nm, more preferably 80 nm to 250 nm (measured with the Malvern® Autosizer 2 C).

Suitable acrylate dispersions and styrene-acrylate dispersions for preparing corrosion control paints are available commercially, as for example Acronar S 760 or Acronal® LR 8977 (BASF Aktiengesellschaft) or Acronal® Optive 410 (BASF Corporation).

Styrene-Alkadiene Polymers (A2)

In a further, preferred embodiment of the invention the binder system for atmospherically curable systems is an aqueous or predominantly aqueous dispersion of styrene-alkadiene polymers (A2).

Aqueous dispersions of styrene-alkadiene polymers (A2) for preparing corrosion control paints are known in principle to the skilled worker and described for example in EP-A 47380. They may preferably be primary dispersions or else secondary dispersions.

Suitable polymers (A2) comprise as principal monomers styrene and also at least one conjugated aliphatic diene (alkadiene). The alkadienes may be, for example, butadiene, isoprene, 1,3-pentadiene or dimethylbutadiene. The styrene may also be substituted by alkyl groups. Examples comprise α-methylstyrene or 4-methylstyrene. The principal monomers are preferably styrene and butadiene. In general the polymers comprise at least 20% by weight styrene and 20% by weight alkadienes, the amount of the principal monomers together being in general at least 60% by weight, preferably at least 80% by weight. The quantities are based in each case on the sum of all of the monomers. They may additionally have further comonomers as well. Here mention may be made, on the one hand, of ethylenically unsaturated carboxylic and/or dicarboxylic acids such as (meth)acrylic acid, maleic acid or itaconic acid. Additionally the comonomers may be ethylenically unsaturated carbonitriles such as (meth)acrylonitrile and also alkyl(meth)acrylates such as methyl (meth)acrylate, n-butyl (meth)acrylate, n-hexyl (meth)acrylate, n-octyl acrylate or 2-ethylhexyl (meth)acrylate.

Styrene-alkadiene polymers (A2) can be prepared in a way which is known in principle by means of emulsion polymerization. Further details of styrene-butadiene polymers for coating materials and also of their preparation are disclosed for example in "Paints and Coatings, 2.4.8. Polystyrene and Styrene Copolymers" in Uflmann's Encyclopedia of Technical Chemistry, 6th Edition 2000, Electronic Release.

Particularly suitable for performing the invention are styrene-butadiene polymers which comprise as a secondary monomer one or more acidic monomers, such as, for example, (meth)acrylic acid, preferably in an amount of 0.5% to 5% by weight. For use as binders for the formulation it is possible with preference for some or all of the acid groups to be neutralized with suitable bases, such as ammonia.

The styrene-butadiene polymers (A2) employed ought in general to have a glass transition temperature $T_g$ in the range from 0 to 60° C., preferably in the range from 5 to 40° C. The glass transition temperature can be chosen by the skilled worker in a way which is known in principle through the selection and the proportion of hard monomers and soft monomers.

Preferably for performing the invention it is possible in addition to use styrene-butadiene polymers (A2) having an average particle size of 50 nm to 400 nm, more preferably 80 nm to 250 nm (measured as above).

Polyurethanes (A3)

In another, preferred embodiment of the invention the binder system for atmospherically curable systems is an aqueous or predominantly aqueous dispersion of polyurethanes (A3).

Aqueous dispersions of polyurethanes (A3) for preparing corrosion control paints are known in principle to the skilled worker. Details of polyurethanes for coating materials and also of their preparation are disclosed for example in "Paints and Coatings, 2.9 Polyurethane Coatings" in Ullmann's Encyclopedia of Technical Chemistry, 6th Edition 2000, Electronic Release. The aqueous dispersions of the polyurethanes (A3) may be either primary dispersions or secondary dispersions.

Polyurethanes for aqueous dispersions can be synthesized, in a way which is known in principle, from customary diisocyanates and also dials. With a view to effective film formation and good elasticity, dials particularly suitable for this purpose are those having a number-average molecular weight $M_n$ of about 500 to 5000 g/mol, preferably about 1000 to 3000 g/mol. For this purpose it is possible to use both polyether dials and polyester diols. The amount of such dials of relatively high molecular weight is typically 10 to 100 mol % relative to the sum of all the diols. The desired hardness and elasticity of the film can be controlled by using, in addition to the diol already mentioned, low molecular weight dials having a number-average molecular weight $M_n$ of about 60 to 500 g/mol.

For the synthesis of polyurethanes for aqueous dispersions use is made, furthermore, of monomers which comprise at least one isocyanate group or one group which is reactive toward isocyanate groups, and also, additionally, at least one hydrophilic group. These may be nonionic groups such as polyoxyethylene groups, acidic groups such as COOH, sulfonate or phosphonate groups, or basic groups such as amino groups, for example. With preference they are acidic groups. For use as binders for the formulation it is possible with preference for all or some of the acid groups to be neutralized with suitable bases. Preferred for this purpose are ammonia or amines. Further details on such polyurethane dispersions and also their preparation are described at length in WO 2005/005565, page 4 line 13 to page 14 line 14. Further examples of suitable polyurethanes are disclosed in U.S. Pat. No. 5,707,941 or in WO 2004/101638, especially page 2 line 31 to page 14 line 11.

The polyurethanes may also have been modified. By way of example, the compounds in question may be oxidatively curing urethane alkyds. For the preparation it is possible to subject, for example, triglycerides of unsaturated fatty acids to partial hydrolysis. The resultant OH group is able to react with the isocyanate groups in the course of polyurethane preparation.

With preference for performing the invention it is possible additionally to use polyurethanes (A3) having an average particle size of not more than 1000 nm, preferably less than 500, more preferably less than 200 μm, and in particular 20 to 200 nm.

Alkyd Resins (A4)

In a further, preferred embodiment of the invention the binder system for atmospherically curable systems is an aqueous or predominantly aqueous dispersion of alkyd resins (A4).

Aqueous dispersions of alkyd resins (A4) for preparing corrosion control paints are known in principle to the skilled worker. Alkyd resins (A4) are oxidatively curing polycondensation resins of polyols and polybasic carboxylic acids, in which at least one OH group of the polyol is esterified with fatty oils and/or with natural and/or synthetic mono- or polyunsaturated fatty acids, it being necessary for at least one of the polyols employed to have a functionality of three or more.

Examples of preferred polyhydric alcohols comprise glycerol, pentaerythritol, trimethylolethane, trimethylolpropane, various diols such as ethanediol/propanediol, diethylene glycol and neopentyl glycol.

Preferred polybasic carboxylic acids are phthalic acid (anhydride) (PAn), isophthalic acid, terephthalic acid, trimellitic anhydride, adipic acid, azelaic acid, sebacic acid; phthalic acid (anhydride) is particularly preferred.

Examples of suitable oil components or fatty acids include drying oils, such as linseed oil, oiticica oil or tung oil, semidrying oils, such as soybean oil, sunflower oil, safflower oil, dehydrated castor oil or tall oil, nondrying oils, such as castor oil, coconut oil or peanut oil, or free fatty acids of above oils.

The molar mass $M_n$ of typical alkyd resins is between 1500 and 20 000 g/mol, preferably between 3500 and 6000 g/mol. The acid number is preferably 2 to 30 mg KOH/g, or else 35-65 mg KOH/g in the case of water-dilutable resins. The OH number is generally up to 300, preferably up to 100 mg KOH/g.

The term "alkyd resins" is also intended to comprise modified alkyd resins such as styrene-modified alkyd resins, urethane alkyds, urethane oils or epoxy resin-modified alkyd resins. Modified alkyd resins of this kind are known to the skilled worker.

Further details of alkyd resins (A4) for coating materials and also of their preparation are disclosed for example in "Paints and Coatings, 2.6. Alkyd Coatings" in Ullmann's Encyclopedia of Technical Chemistry, 6th Edition 2000, Electronic Release, and also in "Lackformulierung and Lackrezeptur" [Paint Formulation and Paint Formula], edited by Ulrich Zorli, p. 188 ff., Curt R. Vinzentz Verlag, Hanover, 2003.

The alkyd resins (A4) employed ought in general to have a glass transition temperature $T_g$ in the range from 0 to 60° C., preferably from 5 to 40° C.

Fillers and Pigments (C)

The formulations used for the process of the invention, examples being the stated formulations curable thermally, photochemically or under atmospheric conditions, may further comprise at least one finely divided inorganic filler or inorganic pigment (C). The filler may also comprise an organic coating, for hydrophobicizing or hydrophilicizing, for example. The filler ought not to exceed an average particle size of 10 μm. With preference the average particle size amounts to 10 nm to 9 μm and more preferably from 100 nm to 5 μm. In the case of round or approximately round particles this figure refers to the diameter; in the case of particles of irregular shape, such as with needle-shaped particles, for example, it refers to the longest axis. By particle size is meant the primary particle size. The skilled worker is aware, of course, that finely divided solids frequently undergo agglomeration to larger particles, which for use must be dispersed intensively. The particle size is selected by the skilled worker in accordance with the desired properties of the layer. It is guided, for example, by the desired layer thickness as well. As a general rule, the skilled worker will select smaller particles for a low layer thickness.

Suitable fillers include on the one hand electrically conductive pigments and fillers. Additives of this kind serve to improve the weldability and to improve subsequent coating with electrocoat materials. Examples of suitable electrically conducting fillers and/or pigments comprise phosphides, vanadium carbide, titanium nitride, molybdenum sulfide, graphite, carbon black or doped barium sulfate. Preference is given to using metal phosphides of Zn, Al, Si, Mn, Cr, Fe or Ni, in particular iron phosphides. Examples of preferred metal phosphides comprise CrP, MnP, $Fe_3P$, $Fe_2P$, $Ni_2P$, $NiP_2$ or $NiP_3$.

It is also possible to use nonconducting pigments or fillers, such as finely divided amorphous silicon oxides, aluminum oxides or titanium oxides, for example, which may also have been doped with further elements. As an example it is possible to use amorphous silica modified with calcium ions.

Further examples of pigments comprise anticorrosion pigments such as zinc phosphate, zinc metaborate or barium metaborate monohydrate.

It will be appreciated that mixtures of different pigments can also be used. The pigments are used in an amount of from 20 to 70% by weight. The precise amount is determined by the skilled worker in accordance with the desired properties of the layer. When using conductivity pigments the amounts employed are normally greater than when using nonconducting fillers. Preferred amounts in the case of conductive pigments and fillers are from 40 to 70% by weight; preferred amounts in the case of nonconductive pigments are from 20 to 50% by weight.

Corrosion Inhibitors (D)

As organic corrosion preventative (D) the compositions used in accordance with the invention further comprise at least one dithiophosphinic acid and/or salts thereof as defined above.

The dithiophosphinic acids and/or salts thereof used in accordance with the invention are employed normally in an amount of 0.1% to 20% by weight, in particular 0.25% to 10%, preferably 0.5% to 8%, more preferably 1% to 6% by weight and very preferably 2% to 5% by weight.

The formulation, as will be appreciated, may additionally also further comprise other organic corrosion preventatives and/or inorganic corrosion preventatives.

Solvents (E)

As component (E) the formulations may further comprise a suitable solvent, in which the components are in solution and/or dispersion, in order to allow uniform application to the surface. It is also possible in principle, however, to make the formulation solvent-free or essentially solvent-free, as a powder coating material. The use of a solvent is preferred.

Suitable solvents are those capable of dissolving, dispersing, suspending or emulsifying the compounds of the invention. They may be organic solvents or water. As will be appreciated, mixtures of different organic solvents or mixtures of organic solvents with water can also be used. Among the solvents possible in principle, the skilled worker makes an appropriate selection in accordance with the desired end use and with the identity of the compound of the invention used.

Examples of organic solvents comprise hydrocarbons such as toluene, xylene or mixtures such as are obtained in the refining of crude oil such as for example, hydrocarbon fractions with defined boiling points. Further examples comprise ethers such as THF or polyethers such as polyethylene glycol, ether alcohols such as butyl glycol, ether glycol acetates such as butyl glycol acetate, ketones such as acetone, and alcohols such as methanol, ethanol or propanol.

In the case of the abovementioned radiation-curable systems it is preferred as solvents to use the abovementioned reactive diluents (V'). As will be appreciated, however, it is also possible in the case of radiation-curable systems to use further solvents, containing no crosslinkable groups, as well.

In addition it is also possible to use formulations which comprise water or a predominantly aqueous solvent mixture. By this are meant those mixtures which comprise at least 50% by weight, preferably at least 65% by weight and more preferably at least 80% by weight water. Further components are water-miscible solvents. Examples comprise monoalcohols such as methanol, ethanol or propanol, higher alcohols such as ethylene glycol or polyether polyols and ether alcohols such as butyl glycol or methoxypropanol.

The amount of the solvents is selected by the skilled worker in accordance with the desired properties of the formulation and with the desired application method. As a general rule the weight ratio of the layer components to the solvent is from 10:1 to 1:10, preferably about 2:1, without any intention that the invention should be restricted thereto. It is, of course, also possible first to prepare a concentrate and only to dilute it to the desired concentration when on site.

The formulation is prepared by intensively mixing the components of the formulation with the solvents. Suitable mixing or dispersing equipment is known to the skilled worker.

Assistants and Additives (F)

In addition to components (A) to (E) described, the formulations may further comprise, optionally, one or more auxiliaries and/or additives (F). The purpose of such auxiliaries and/or additives is to fine-tune the properties of the layer. Their amount generally does not exceed 20% by weight of the sum of all the components bar the solvents, preferably not 10%.

Examples of suitable additives are color and/or effect pigments, reactive diluents for the thermal cure, rheological assistants, UV absorbers, light stabilizers, free-radical scavengers, thermal crosslinking catalysts, slip additives, polymerization inhibitors, defoamers, emulsifiers, devolatilizers, wetting agents, dispersants, adhesion promoters, leveling agents, film-forming auxiliaries, rheology control additives (thickeners), flame retardants, siccatives, antiskinning agents, other corrosion inhibitors, waxes, and flatting agents, such as are known from the textbook "Lackadditive" [Additives for coatings] by Johan Bieleman, Wiley-VCH, Weinheim, N.Y., 1998, or from German patent application DE 199 14 896 A 1, column 13 line 56 to column 15 line 54.

Treatment of the Metallic Surface

To implement the process of the invention the metallic surface is treated with a suitable formulation comprising dithiophosphinic acid.

The application technique is guided by the type of corrosion control layer desired. Techniques for applying corrosion control layers are known in principle to the skilled worker.

Coil Coating

Described below, first of all and by way of example, is one typical coil coating procedure.

Prior to the treatment of the surface with the crosslinkable formulation, it is possible optionally for the surface to be cleaned. Where the treatment of the invention takes place immediately after a metallic surface treatment, such as an electrolytic galvanization or a hot-dip galvanization of steel coils, then the coils may generally be contacted with the treatment solution of the invention without prior cleaning. Where, however, the metal coils for treatment have been stored and/or transported prior to the coating in accordance with the invention, they generally carry corrosion prevention oils or at least are soiled to an extent such that cleaning is required prior to coating in accordance with the invention. Cleaning can take place by methods known to the skilled worker, using customary cleaning agents.

In the process of the invention for applying corrosion control layers, especially integrated pretreatment layers, the surface of the metal is treated with the formulation, by spraying, dipping or rolling, for example. After a dipping operation excess treatment solution can be removed from the workpiece by allowing it to drip dry; in the case of metal sheets, metal foils or the like, excess treatment solution can alternatively be removed by squeezing off or squeegeeing, for example. In the course of the treatment, parts at least of the polymer used, and also further components of the formulation, are chemisorbed by the surface of the metal, so that a solid bond comes about between the surface and the components. Treatment with the formulation takes place generally at room temperature, although this is not intended to rule out the possibility of higher temperatures in principle.

The treatment can be what is called a no-rinse operation, in which the treatment solution is dried directly in a drying oven immediately following its application, without rinsing. It is also possible, however, to rinse the surface, after treatment, with a cleaning fluid.

In the case of the particularly preferred coating of metal coils, coating may be performed both on one side and on both sides. With very particular preference coating takes place by means of a continuous process.

Coil coating may be performed, for example, by means of a continuously operating coil coating plant, as described in Römpp Lexikon Lacke and Druckfarben, Georg Thieme Verlag, Stuttgart, N.Y., 1998, page 55, "Coil coating", or in German patent application DE 196 32 426 A 1. It will be appreciated that plants of other construction can also be used.

The speed of the metal coil is selected by the skilled worker in accordance with the application and curing properties of the formulation employed. Speeds which have proven appropriate are in general from 10 to 200 m/min, preferably from 12 to 120 m/min, more preferably from 14 to 100 m/min, very preferably from 16 to 80 and in particular from 20 to 70 m/min.

The formulations used in accordance with the invention can be applied in any way, by spraying, flow coating or roll coating, for example. Among these application techniques, roll coating is particularly advantageous and is therefore used with preference in accordance with the invention.

Each application step in roll coating can be conducted with two or more rolls. Preference is given to employing from two to four rolls, and especially two rolls.

In roll coating, the rotating pick-up roll dips into a reservoir of the coating material of the invention and so picks up the coating material that is to be applied. This material is transferred from the pick-up roll to the rotating application roll directly or via at least one transfer roll. The coating material is stripped from this application roll and so transferred to the coil as it runs in the same or opposite direction.

As an alternative, the formulation can also be pumped directly into a gap or nip between two rolls, this being referred to by those in the art as nip feed.

In accordance with the invention, transfer by reverse stripping, or the reverse roller coating technique, is of advantage and is therefore employed with preference.

In roll coating, the circumferential speeds of the pick-up roll and the application roll may vary greatly from one coating operation to another. The application roll preferably has a circumferential speed which is from 110 to 125% of the coil speed, and the pick-up roll a circumferential speed which is from 20 to 40% of the coil speed.

Following the application of the formulation used in accordance with the invention, any solvent present in the layer is removed and the layer is crosslinked. This can take place in two separate steps, but can also take place simultaneously. To remove the solvent, the layer is preferably heated by means of an appropriate apparatus. Drying can also take place by contacting with a stream of gas. The two methods can be combined.

Thermal and/or Photochemical Crosslinking

The curing method is guided by the nature of the crosslinker. It is also possible to cure thermally with actinic radiation, or through a combination of thermal curing and actinic radiation curing. Joint curing with heat and actinic radiation is also referred to by those in the art as dual cure. Actinic radiation hereinbelow means to the skilled worker, conventionally, "chemically active" radiation, i.e., electromagnetic radiation or corpuscular radiation that is able to trigger chemical reactions. Examples of electromagnetic radiation comprise near infrared, visible light, UV radiation or X-rays.

The temperature required for curing is guided in particular by the crosslinkable binder system used. Highly reactive binder systems can be cured at lower temperatures than binder systems of relatively low reactivity. As a general rule, crosslinking is conducted at temperatures of at least 60° C., preferably at least 80° C., more preferably at least 100° C., and with particular preference at least 120° C. In particular the crosslinking may be conducted at 100 to 250° C., preferably 120 to 220° C., and more preferably at 150 to 200° C. The temperature referred to in each case is the peak temperature found on the metal (peak metal temperature (PMT)), which can be measured by means of techniques familiar to the skilled worker (for example, contactiess infrared measurement or determination of the temperature using adhered test strips).

Heating of the coating films of the invention in the case of thermal curing takes place preferably by convection heat transfer, irradiation with near or far infrared and/or, in the case of iron-based coils, by electrical induction.

The heating time, i.e., the duration of the thermal cure, varies depending on the coating material of the invention that is employed. The time is preferably from 10 s to 2 min.

Where essentially convection heat transfer is employed, the need is for forced-air ovens with a length of from 30 m to 50 m, in particular from 35 m to 45 m, at the preferred coil speeds. The forced-air temperature can be up to 350° C.

In the case of radiation curing, the drying and curing of the coatings may take place under normal temperature conditions, i.e., without heating of the coating. The inventively used mixtures, alternatively, can be employed for producing coatings which, following application, are dried and cured at an elevated temperature, for example at 40 to 150° C., preferably 40 to 130° C., and in particular at 40 to 100° C.

Radiation sources suitable for the radiation cure include, for example, low-pressure, medium-pressure, and high-pressure mercury lamps, and also fluorescent tubes, pulsed lamps, metal halide lamps or excimer sources, Depending on the nature of the photoinitiator employed it is possible to use UV, VIS or NIR radiation. It will be appreciated that radiation sources emitting in different wavelength ranges can also be used.

Curing may also take place by means of electron beams, examples being those with 150 to 300 keV.

Irradiation may if appropriate also be carried out in the absence of oxygen, such as under an inert gas atmosphere, for example. Suitable inert gases are preferably nitrogen, noble gases, carbon dioxide, or combustion gases. Irradiation may additionally take place with the coating composition covered with transparent media. Examples of transparent media are polymeric films, glass or liquids, water for example. Particular preference is given to irradiation in the manner as described in DE-A1 199 57 900.

The process of the invention allows a corrosion control layer, especially an integrated pretreatment layer, to be obtained on a metallic surface. Preferably it is a layer on the surface of iron, steel, zinc or zinc alloys, aluminum or aluminum alloys. The exact structure and composition of the integrated layer is not known to us. It comprises, besides the reaction products of the polymer and also of the crosslinker, dithiophosphinic acids and/or salts thereof, and, optionally, further components. In addition there may also be components present that have been extracted from the metal surface and deposited again, such as customary amorphous oxides of aluminum or of zinc and also, if appropriate, of other metals, for example. The composition of the layer appears not to be homogeneous but instead to exhibit concentration gradients.

The thickness of the corrosion control layer is laid down by the skilled worker in accordance with the desired properties of the layer. In general for coil coating applications, and particularly for the application of integrated corrosion control layers, a thickness of from 1 to 25 μm has been found appropriate, although in special cases the thicknesses may also be situated outside of these ranges. Preference is given to a thickness of from 3 to 15 μm, more preferably from 4 to 10 μm and in particular from 5 to 8 μm. The thickness is a product of the quantity of the composition applied in each case.

Atop the metallic surface with the corrosion control layer applied in accordance with the invention, in particular with an integrated pretreatment layer, it is possible for further coating layers to be applied.

This can be done in the above-described coil coating plant. In that case two or more application stations and, optionally, curing stations are arranged in series. Alternatively, however, after the corrosion control layer has been applied and cured, the coated coil can be wound up again and further layers applied in other plants at a later time.

The coated metal coils can be processed further on site, or they can be transported for further processing to another site. For this purpose they can be provided, for example, with removable protective films.

Coils provided with an integrated pretreatment layer can first be reduced in size, without further coating, and processed further to shaped parts. Different shaped parts can also be assembled by welding. Examples of suitable shaping methods include pressing and deep drawing. The resultant profile elements and shaped parts are scratch-resistant, stable to corrosion, stable to weathering and stable to chemicals, and can be overcoated readily with any of a very wide variety of coating materials. The coating material without conductive pigments can be used as a substitute for cathodic electrocoat if it is employed in a layer thickness of about 10-15 µm.

Atmospheric Corrosion Control

For the application of corrosion control layers for atmospheric corrosion control, the following procedure has been found appropriate.

Coatings for atmosphere corrosion control may be all kinds of corrosion control coatings, such as, for example, primer coatings (I), intermediate coatings (II), and top coatings (Ill). The corrosion control coatings in question may of course also be coatings which combine the properties of at least two of these layers or all three layers, and hence contribute to a simplified coat system. The coating in question may also be a shop coating. The skilled person understands a shop coating to be a coat that can be applied to freshly blasted steel in order to ensure corrosion control even during the manufacture of steel components—thus, for example, during the welding together of parts.

The process with inventive use of dithiophosphinic acids may serve for OEM protection or else for renovation.

As a general rule it is advisable to prepare the metallic surface for the execution of the process of the invention, although this is not absolutely necessary in every case. By surface preparation for the execution of corrosion control measures, the skilled worker understands the cleaning of the surface to remove all contaminants and also the establishment of a surface roughness appropriate to the corrosion control measure. Examples of cleaning methods comprise cleaning with water or solvents, pickling with appropriate formulations, or high-pressure cleaning. Examples of further measures comprise abrasion and, in particular, blasting of the surface, sand blasting for example, and also flame blasting as well. In such operations it is possible for all of the adhering coats to be removed, down to the bare metal. It is, however, also possible, using less intensive methods, to remove only those coats whose adhesion is poor, while leaving intact coats on the surface. One possible technique for this purpose is that known as sweep blasting.

To implement the process of the invention, at least one corrosion control layer with a thickness of at least 15 µm is applied to the metallic surface, using the described formulation which can be crosslinked under atmospheric conditions.

The corrosion control layer may in this case be applied directly to the bare metallic surface or else to a surface which has already been coated with a corrosion control layer.

Preferably at least one corrosion control layer is a priming coat (I), which is applied either directly to the bare metal or to a metal surface bearing a shop coating. The shop coating optionally present may likewise be obtained with the formulation of the invention or else by means of another formulation.

Application can be carried out using the customary techniques known to the skilled worker. The formulation is preferably applied by brushing or spraying.

Following its application to the surface, the applied coating cures under atmospheric conditions. At its most simple this can be accomplished by the gradual evaporation of the solvent. Depending on the nature of the binder employed, other crosslinking processes may also run their course. Details of this have already been presented above.

Depending on the thickness of the desired corrosion control layer, the entire layer may be applied in a single operation, or else two or more layers of the same kind may be applied in succession and cured in each case, in order to achieve the desired total thickness of the corrosion control layer.

Atop the primer coat (I) it is possible for further corrosion control layers to be applied. The nature and number of the further layers are determined by the skilled worker. In particular, the primer coat (I) may be provided in further operations with a tie coat (II) and with a topcoat (III). For this purpose it is possible in principle to use any desired coating systems, provided that no unwanted effects arise in combination with the primer coat (I). Dithiophosphinic acids can be used as corrosion inhibitors in all 3 coats.

In a further, preferred embodiment of the process, first of all an integrated primer coat (Ia) is applied which can be overcoated directly with a topcoat (III). An integrated primer coat thus combines the properties of the primer coat (I) and of the tie coat (III).

In a further, preferred embodiment of the invention only a single integrated corrosion control layer (Ib) is applied, which requires no overcoating. An integrated corrosion control layer thus combines the properties of all three coats.

The thickness of a cured at least one corrosion control layer for atmospheric corrosion control amounts in general to at least 15 µm, preferably at least 25 µm, more preferably at least 40 µm, very preferably at least 60 µm, and, for example, at least 100 µm. It is determined by the skilled worker in accordance with the desired properties and intended use of the layer.

Shop coatings are typically thin—15 to 25 µm, for example. The thickness of corrosion control layers which are not shop coats is generally at least 25 µm, preferably at least 40 µm, more preferably at least 60 µm, and very preferably at least 100 µm.

The upper limit on the total layer thickness in atmospheric corrosion control, i.e., the thickness of all of the applied corrosion control layers together, is 2 mm, preferably less than 1.5 mm, more preferably less than 1 mm, with very particular preference less than 800 µm, and in particular less than 500 µm.

The examples below are intended to illustrate the invention.

Base Formulas

The corrosion control effect of dithiophosphinic acids was tested in different corrosion control formulations:

Base Formula for Coil Coating Material (Organic) Based on Epoxy Binders

For the formulation for producing an integrated pretreatment layer the following components were used:

| Component | Description | Amount [parts by weight] |
|---|---|---|
| Binder with crosslinking groups | Epoxy binder based on bisphenol A (molecular weight 1000 g/mol, viscosity 13 dPas/s, and 50% solids content) | 26.9 |
| Fillers | Hydrophilic pyrogenic silica (Aerosil ® 200V, Degussa) | 0.16 |
| | Talc, Finntalk M5 | 2.9 |
| | White pigment, titanium rutile 2310 | 10.8 |
| | Silica modified with calcium ions (Shieldex ®, Grace Division) | 3.0 |
| | Zinc phosphate (Sicor ® ZP-BS-M, Waardals Kjemiske Fabriken) | 4.1 |
| | Black pigment (Sicomix ® Schwarz, BASF AG) | 1.0 |
| Solvent | Butyl glycol | 5.0 |

The components were mixed in the order stated in a suitable stirring vessel and predispersed with a dissolver for ten minutes. The resulting mixture was transferred to a bead mill with cooling jacket and mixed with 1.8-2.2 mm-sized SAZ glass beads. The millbase was ground for 1 h 30' minutes. Subsequently the millbase was separated from the glass beads.

The millbase was admixed with stirring in the order stated with 5.9 parts by weight of a blocked hexamethylene diisocyanate (Desmodur® VP LS 2253 from Bayer AG) and 0.4 part by weight of a commercially customary tin-free crosslinking catalyst (Borohi® VP 0245 from Borchers GmbH).

INVENTIVE EXAMPLES 1 TO 4, COMPARATIVE EXAMPLES 1 AND 2

The base formula was admixed additionally in each case with 3 parts by weight in each case of one of the dithiophosphinic acids or salts thereof for use in accordance with the invention. The dithiophosphinic acids used in each case are assembled in each case in Table 1.

For comparison purposes one base formula was left without any addition, and also, in one sample, a different inhibitor was used.

TABLE 1

Corrosion inhibitors used for the experiments

| No. | Corrosion inhibitor |
|---|---|
| Inventive Example 1 | di-p-toloyldithiophosphinic acid |
| Inventive Example 2 | sodium diisobutyldithiophosphinate |
| Inventive Example 3 | dicyclohexyldithiophosphinic acid |
| Inventive Example 4 | sodium dicyclohexyldithiophosphinate |
| Comparative Example 1 | none |
| Comparative Example 2 | 3-phenylthiopropionamide |

Application of the Integrated Pretreatment Layers of the Invention

The compositions were applied using bar coaters to steel plates of grade Z (OEHDG 2, Chemetall) and to aluminum plates AlMgSi (AA6016, Chemetall) in a wet layer thickness such that after curing in a tunnel drier at a forced-air temperature of 185° C. and a plate temperature of 171° C. the resultant coatings have a dry coat thickness of 6 μm.

Testing of the Coatings

Testing of the Steel Panels:

With steel plates a standardized 10-week alternating climatic conditions test was carried out (VDA [German Automakers Association] alternating climatic conditions test; VDA test sheet 621-415, February 82).

After the end of corrosion exposure the panels were evaluated visually. An assessment was made both of the formation of corrosion products on the undamaged paint surface and also of the edge creep and scribe creep.

The following scores were awarded

−=more corrosion damage than in the case of the blank sample
0=corrosion damage the same as for the blank sample
+=less corrosion damage than in the case of the blank sample
++=substantially less corrosion damage than in the case of the blank sample Testing of the Aluminum Panels:

On aluminum plates the acetic acid salt spray test ESS (DIN 50021, June 88) was carried out. After the end of corrosion exposure the panels were evaluated visually. An evaluation was made of the areas of circular delamination over the whole paint surface.

The scores awarded were as follows

0=corrosion damage as in the case of the blank sample
+=less corrosion damage than in the case of the blank sample
++=substantially less corrosion damage than in the case of the blank sample The results of the tests are summarized in Table 2:

TABLE 2

Compilation of the results of the corrosion control test

| Formulation of | Inhibitors | Evaluation steel | Evaluation aluminum |
|---|---|---|---|
| Inventive Example 1 | di-p-toloyldithiophosphinic acid | ++ | ++ |
| Inventive Example 2 | sodium diisobutyldithiophosphinate | ++ | ++ |
| Inventive Example 3 | dicyclohexyldithiophosphinic acid | ++ | ++ |
| Inventive Example 4 | sodium dicyclohexyldithiophosphinate | ++ | 0 |
| Comparative Example 1 | none | 0 | 0 |
| Comparative Example 2 | 3-phenylthiopropionamide | 0 | 0 |

The inventive and comparative examples show that excellent results are achieved with dithiophosphinic acids. They also show that not any inhibitor is equally suitable for thin corrosion control layers.

Photochemically Crosslinkable Mixture (Base Formula)

| Component | Description | Amount (parts by weight) |
|---|---|---|
| | Aliphatic urethane acrylate, 70% strength in monofunctional acrylic ester monomer | 45 |
| | Acidic adhesion promoter based on an acidic phosphoric ester/acrylic ester/methacrylic ester | 6.5 |
| | Reactive diluent: monofunctional acrylic ester monomer | 20.5 |
| | Commercial photoinitiator (Irgacure ®) 184 | 7.5 |
| | Amorphous silica | 20 |
| | Zinc nitroisophthalate | 0.5 |

The components were mixed in the order stated in a suitable stirring vessel and predispersed with a dissolver for ten minutes. The resulting mixture was mixed with 1.8-2.2 mm SAZ glass beads. The millbase was dispersed in a Skandex for 2 hours. Subsequently the millbase was separated from the glass beads.

The base formula was admixed additionally with 1, 2 and 3 parts by weight of the dithiophosphinic-acid for use in accordance with the invention. For comparison purposes, one base formula was left without addition.

TABLE 3

Corrosion inhibitors used for photochemically curable systems

| No. | Inhibitor |
|---|---|
| Inventive Example 5 | 1% di-p-toloyldithiophosphinic acid |
| Inventive Example 6 | 2% di-p-toloyldithiophosphinic acid |
| Inventive Example 7 | 3% di-p-toloyldithiophosphinic acid |
| Comparative Example 3 | none |

Application of the Integrated Pretreatment Layers of the Invention

The compositions were applied using bar coaters to steel plates of grade Z (OEHDG 2 from Chemetall) in a layer thickness of 7 µm. Curing took place with a UV unit at a belt speed of 2 m/min using 2 medium-pressure mercury lamps each with a power consumption of 120 W/cm.

Testing of the Steel Panels:

A salt spray test was carried out on the steel panels. After the end of corrosion exposure the panels were evaluated visually. An evaluation was made of the degree of rust in accordance with DIN 53210.

The results of the tests are compiled in Table 4:

TABLE 4

Compilation of results of corrosion control tests in UV coatings

| Formulation as per | Evaluation after 200 h salt spray test | Evaluation after 500 h salt spray test |
|---|---|---|
| Inventive Example 5 | R2, m3/g1 | R3, m5/g2-3 |
| Inventive Example 6 | R0, m0/g0 | R1, m0/g0 |
| Inventive Example 7 | R0, m0/g0 | R0, m0/g0 |
| Comparative Example 3 | R4, m3/g2 | R6, m5/g5 |

Guide Formulation for Corrosion Control Primers

For the purpose of performance testing for atmospheric corrosion control, a corrosion control formulation was used that was based on a commercial aqueous styrene-acrylate dispersion for paints (Acronal® Optive 410, BASF Corp.). The dispersion used has the following properties:

| Solids content | 49-51% |
|---|---|
| pH | 7.5-8.5 |
| Brookfield viscosity | 500-1000 cps |
| Density | 1.06 g/cm$^3$ |
| Minimum film forming temperature (MFFT, to ASTM D 2354) | about 12° C. |
| Particle size | about 110 nm |

The test formula was prepared in accordance with the following general instructions:

393.4 g of the styrene-acrylate dispersion are admixed with 2.2 g of a commercial defoamer for coating materials (mixture of polysiloxanes and hydrophobic solids in polyglycol; BYK® 022, Byk), after which a mixture consisting of 0.6 g of an anionic dispersant (acidic phosphoric ester of a fatty alcohol alkoxylate; Lutensit® A-EP, BASF AG), 11.0 g of concentrated ammonia and 58.6 g of water is added by means of a Dispermat. Incorporated additionally, with stirring, is a mixture of 7.2 g of phenoxypropanol (film-forming assistant) and 7.2 g of benzine 180-210° C. (film-forming assistant).

Added subsequently are 85.0 g of a hematite pigment (Bayferrox® 130M, Lanxess), 82.1 g of an anticorrosion pigment based on zinc molybdenum phosphate (Heucophos® ZMP, basis zinc molybdenum orthophosphate hydrate, Heubach), 36.0 g of magnesium silicate (filler; talc 20 M 2, Luzenac) and 127.8 g of a filler based on barium sulfate and zinc sulfide (30% by weight ZnS) (Litopone® L). The whole mixture is dispersed for at least 30 minutes with glass beads (Ø 3 mm).

Thereafter, with further stirring, 166.4 g of styrene-acrylate dispersion, 1.9 g of BYK® 022 and 3.7 g of a 1:1 mixture of water and a commercial corrosion inhibitor (corrosion inhibitor L 1, Erbslöh) are added and the glass beads are removed by sieving.

To conclude, the batch is admixed with a mixture of 3.7 g of a 25% strength solution of a commercial urethane-based thickener (Collacral PU 85, BASF AG) and 13.2 g of butyl glycol (solvent) and also, if appropriate, the pH is adjusted to about 9.5 using concentrated ammonia. This gives 1000 g of a corrosion control primer with a solids content of 61% and a pigment/volume concentration (PVC) of 23%.

Added to 100 g of the completed coating material were 4.2 g of a 20% strength solution of the ammonia salt of di-2,4,4-trimethylpentyldithiophosphinic acid (corresponding to 3% by weight of solid dithiophosphinic acid based on the solid styrene-acrylate polymer) in solution in butyl glycol (Inventive Example 8).

For comparison purposes, a further sample of the coating material was left without addition of a dithiophosphinic acid (Comparative Example 4).

Application of the Formulations to Steel Panels, Preparation for the Salt Spray Test The primers under test were diluted with fully demineralized water to the desired viscosity (300 to 1000 mPas (ICI Rotothinner Sphere)) and drawn down using a box-section doctor blade onto a cleaned, non-galvanized steel panel (200×80×0.9 mm); the slot size is selected so as to give a dry film thickness of 60-85 µm.

After six days of drying at room temperature and one day of thermal conditioning at 50° C., the reverse side of the test panel was coated with a solvent-based coating material, for protection from corrosion, and the edges were marked off with tesa-film tape.

To conclude, the metal test panel was inscribed down to the substrate, using a scorer, on the side coated with the primer under test.

Salt Spray Test/Evaluation

Using the metal test panels, a salt spray test was conducted in accordance with DIN EN ISO 7253 (duration of test: 240 h).

The corrosion behavior was evaluated by employing the surface corrosion (proportion of the surface corroded after the salt spray test, in relation to the total surface area of the metal test panel, in [%]).

|  | Inventive Example 8 | Comparative Example 4 |
|---|---|---|
| Surface corrosion | about 0% | 90% |

The invention claimed is:

1. A coating in combination with a metallic surface, the coating comprising a radiation-crosslinked polymer positioned on the metallic surface, wherein the crosslinked polymer comprises:

a radiation crosslinked, polymeric binder of a (meth) acrylate monomer, or (meth)acrylate prepolymer selected from the group consisting of polyfunctional (meth)acrylates, urethane (meth)acrylates, polyester (meth)acrylates, epoxy (meth)acrylates, carbonate (meth)acrylates, polyether (meth)acrylates, and any mixture thereof, and 0.25% to 10% by weight of at least one dithiophosphinic acid of formula $HS_2P(R^1)(R^2)$ and/or a salt thereof, wherein $R^1$ and $R^2$ are, independently of one another, organic radicals with 1 to 20 carbon atoms, wherein the coating is a chrome-free corrosion control coating, and has a thickness of from 3 to 15 μm.

2. The coating of claim 1, wherein the polymeric binder is a copolymer of (meth)acrylic acid and one or more comonomers that include an ethylenically unsaturated group and an acidic group.

3. The coating of claim 2, wherein the one or more comonomers is selected from vinyl acetic acid, crotonic acid, isocrotonic acid, maleic acid, fumaric acid, vinylphosphonic acid, allylphosphonic acid, 3-butenylphosphonic acid, monovinyl phosphate, monoallyl phosphate, mono-3-butenyl phosphate, phosphonoxyethyl (meth)acrylate, or styrenesulfonic acid.

4. The coating of claim 1, wherein $R^1$ and $R^2$, independently of one another, are selected from methyl, ethyl, n-propyl, isopropyl, n-butyl, isobutyl, tert-butyl, n-pentyl, n-hexyl, n-heptyl, n-octyl, n-nonyl, n-decyl, n-dodecyl, 2-ethylhexyl, cyclopentyl, cyclohexyl, phenyl or 4-methylphenyl.

5. The coating of claim 1, wherein the polymeric binder further includes a polymer selected from the group consisting of poly(meth)acrylates, partially hydrolyzed polyvinyl esters, polyesters, alkyd resins, polylactones, polycarbonates, polyethers, epoxy resin-amine adducts, polyureas, polyamides, polyimides or polyurethanes.

6. The coating of claim 1, wherein the polymeric binder further includes a polymer selected from polyesters or epoxy resin-amine adducts.

7. The coating of claim 1, wherein the crosslinked polymer comprises a radiation crosslinked, prepolymer of urethane (meth)acrylates a number-average molar mass $M_n$ of from 500 g/mol to 10,000 g/mol, and a (meth)acrylic group content of 2 to 4 mole of (meth)acrylate units per kg of prepolymer.

8. The coating of claim 1, wherein the at least one dithiophosphinic acid is present from 1% to 6% by weight.

9. The coating of claim 1, wherein the at least one dithiophosphinic acid is present from 2% to 5% by weight.

10. The coating of claim 9, wherein the at least one dithiophosphinic acid is selected from di-p-tolyldithiophosphinic acid, diisobutylthiophosphinic acid, dicyclohexylthiophosphinic acid, or the corresponding acid salts thereof.

11. The coating of claim 1, applied as a coil coating to a surface treated steel coil.

12. An aqueous integrated coating in combination with a metallic surface, the coating comprising a styrene-acrylate dispersion, an anticorrosion pigment based on zinc phosphate, and 0.25% to 10% by weight of at least one dithiophosphinic acid of formula $HS_2P(R^1)(R^2)$ and/or a salt thereof, wherein $R^1$ and $R^2$ are, independently of one another, organic radicals with 1 to 20 carbon atoms, wherein the integrated coating, and has a thickness of from 40 to 100 μm.

13. The integrated, coating of claim 12, wherein the at least one dithiophosphinic acid is present from 0.25% to 5% by weight.

14. The integrated coating of claim 12, wherein the at least one dithiophosphinic acid is an ammonium acid salt.

* * * * *